United States Patent
Kurosawa et al.

(10) Patent No.: US 6,822,676 B1
(45) Date of Patent: Nov. 23, 2004

(54) CAMERA CONTROL SYSTEM WITH ELECTRONIC ZOOM PROCESSING

(75) Inventors: Takahiro Kurosawa, Kunitachi (JP); Hiraku Sonobe, Yokohama (JP); Hiroaki Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/231,018

(22) Filed: Jan. 14, 1999

(30) Foreign Application Priority Data

Jan. 19, 1998 (JP) .......................................... 10-007503

(51) Int. Cl.[7] ........................ H04N 5/232; H04N 5/225; H04N 5/262
(52) U.S. Cl. ............................... 348/211.3; 348/207.1; 348/240.2
(58) Field of Search ........................ 348/207.1, 211.99, 348/211.1, 211.3, 211.4, 211.5, 36, 211.7, 211.8, 211.9, 211.13, 211.14, 143, 14.1, 14.07, 14.09, 333.12, 240.2, 240.1, 240.3; 345/753, 661, 756; 709/204, 203, 231, 212, 233

(56) References Cited

U.S. PATENT DOCUMENTS

| | | | | |
|---|---|---|---|---|
| 4,843,475 A | * | 6/1989 | Imai | 348/240.3 |
| 5,396,287 A | * | 3/1995 | Cho | 348/211.8 |
| 5,420,632 A | * | 5/1995 | Yamagiwa | 348/240.3 |
| 5,479,206 A | * | 12/1995 | Ueno et al. | 348/211.5 |
| 5,541,651 A | * | 7/1996 | Iura et al. | 348/240.2 |
| 5,589,878 A | * | 12/1996 | Cortjens et al. | 348/211.12 |
| 5,745,161 A | * | 4/1998 | Ito | 348/211.13 |
| 5,757,418 A | * | 5/1998 | Inagaki | 348/14.07 |
| 5,793,367 A | * | 8/1998 | Taguchi | 345/756 |
| 5,815,199 A | * | 9/1998 | Palm et al. | 348/143 |
| 6,122,005 A | * | 9/2000 | Sasaki et al. | 348/211.3 |
| 6,380,972 B1 | * | 4/2002 | Suga et al. | 348/211.99 |
| 6,396,507 B1 | * | 5/2002 | Kaizuka et al. | 345/661 |
| 6,525,770 B1 | * | 2/2003 | Ueda et al. | 348/222.1 |
| 2001/0040630 A1 | | 11/2001 | Matsuzaka | |
| 2002/0135677 A1 | * | 9/2002 | Noro et al. | 348/143 |

FOREIGN PATENT DOCUMENTS

JP 08-251564 * 9/1996

* cited by examiner

Primary Examiner—Aung Moe
(74) Attorney, Agent, or Firm—Morgan & Finnegan, LLP

(57) ABSTRACT

To solve the problems on camera control such as control of the zoom lens of a camera, caused by the delay time from the time when camera control is performed up to the time when a camera-controlled image arrives, the electronic zoom processing for a displayed image is executed in accordance with the zoom control command, when a zoom control command for the camera is input.

15 Claims, 23 Drawing Sheets

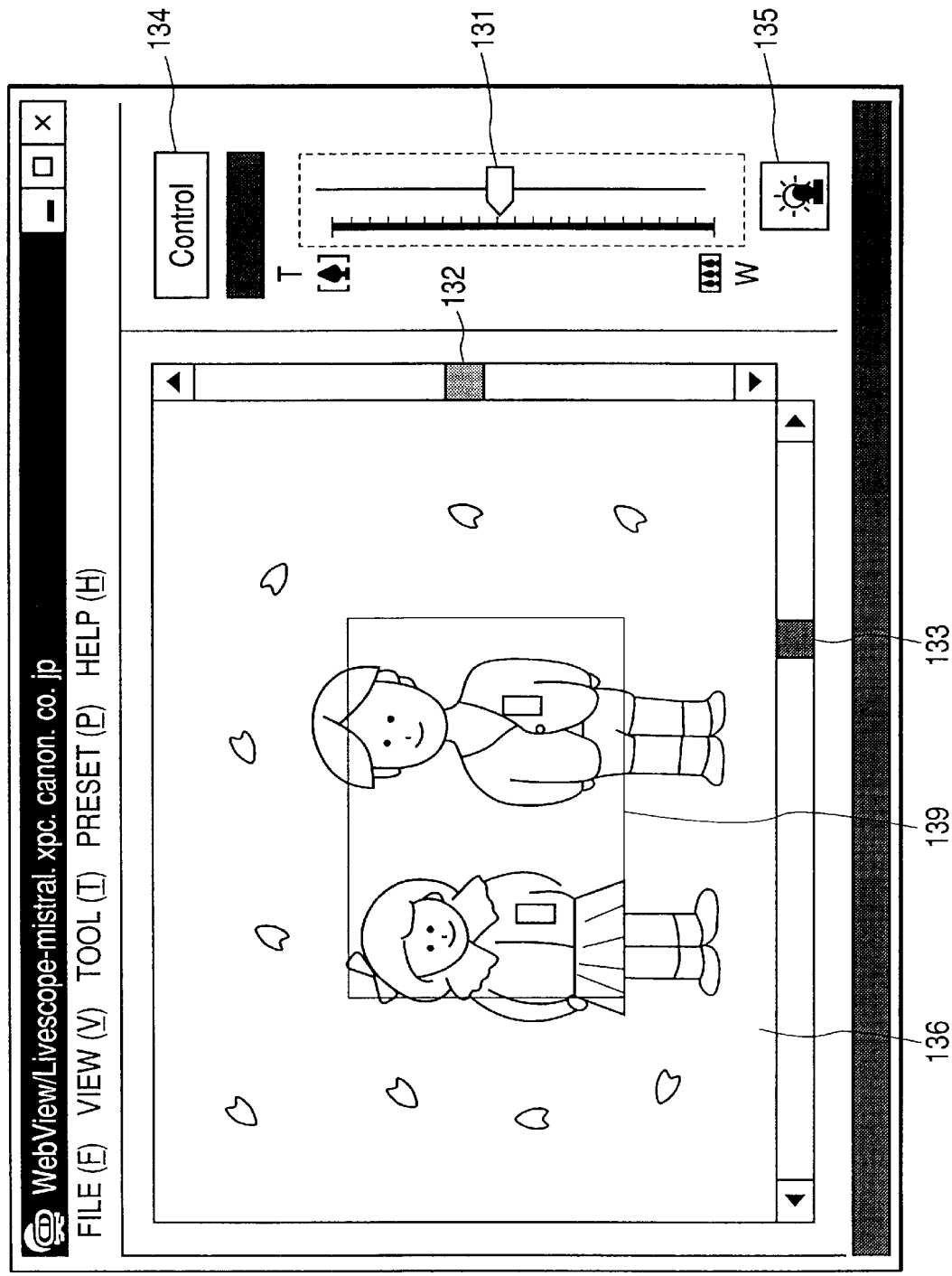

CAMERA CONTROL SYSTEM WITH ELECTRONIC ZOOM PROCESSING

BACKGROUND OF THE INVENTION

1. Field of the Invention

The present invention relates to a camera control system for executing camera control through, for example, a network.

2. Related Background Art

An art has been recently developed which makes it possible to control a camera from a computer (camera server) by connecting the camera to the computer. An image output from the camera is input to the computer through a capture board or the like.

Moreover, a camera control system is realized which delivers media data such as video information and audio information input to the computer to a plurality of clients via a network such as the internet to reproduce the video and audio information by connecting the computer to the network. The above network can use the worldwide internet or the so-called intranetwork such as a network in a local area.

However, the above conventional camera control system is limited in the communication rate of a network. Therefore, a time difference occurs from the point of time of performing camera control by the time when an image formed by undergoing the camera control. Thereby, it is difficult to properly obtain a result of the camera control such as the control of the zoom lens of a camera and thus, purposed control cannot be probably performed.

SUMMARY OF THE INVENTION

The present invention is made to solve the above problems and its object is to provide a camera control system realizing proper remote camera control.

To achieve the above object, according to one aspect of the present invention, there is provided a camera control system for controlling a camera by outputting a control command to a camera server from a client via a network, comprising: display means for displaying an image picked up by said camera; input means for inputting a zoom control command for said camera; and electronic zoom processing means for executing the electronic zoom processing of an image displayed by said display means in accordance with the zoom control command for said camera input by said input means.

Moreover, according to an another aspect of the present invention, there is provided a camera control system for controlling a camera by outputting a control command to a camera server from a client via a network, comprising: display means for displaying an image picked up by the camera; input means for inputting the zoom control command for the camera; and display processing means for displaying a frame showing the display area of an image controlled by the zoom control command for the camera input by the input means by superimposing the frame to the image displayed by the display means.

Furthermore, according to an another aspect of the present invention, there is provided a camera control system for controlling an image picked up by a camera by outputting a control command to a camera server from a client via a network, comprising: display means for displaying an image picked up by the camera; input means for inputting a control command for the image-pickup direction of the camera; and display processing means for predicting an image to be displayed after controlled in accordance with the control command for the image-pickup direction of the camera input by the input means and moving and displaying the area of the image displayed by the display means when the control command for the image-pickup direction of the camera is input, according to the predicted image.

Furthermore, according to an another aspect of the present invention, there is provided a client of a camera control system for controlling a camera by outputting a control command to a camera server via a network, comprising: display means for displaying an image picked up by the camera; input means for inputting the zoom control command for the camera; and electronic zoom processing means for executing the electronic zoom processing on the image displayed by the display means, when the zoom control command for the camera is input by the input means.

Furthermore, according to an another aspect of the present invention, there is provided a client of a camera control system for controlling a camera by outputting a control command to a camera server via a network, comprising: display means for displaying an image picked up by the camera; input means for inputting the zoom control command for the camera; and display processing means for displaying a frame showing the display area of an image controlled by the zoom control command for the camera input by the input means by superimposing the frame to the image displayed by the display means.

Furthermore, according to an another aspect of the present invention, there is provided a client of a camera control system for controlling an image picked up by a camera by outputting a control command to a camera server via a network, comprising: display means for displaying an image picked up by the camera; input means for inputting a control command for the image-pickup direction of the camera; and display processing means for predicting an image to be displayed after controlled in accordance with the control command for the image-pickup direction of the camera input by the input means and moving and displaying the area of the image displayed by the display means when the control command for the image-pickup direction of the camera is input, according to the estimated image.

Furthermore, according to an another aspect of the present invention, there is provided a method for controlling a camera control system for controlling a camera by outputting a control command to a camera server from a client via a network, comprising: the display step of displaying an image picked up by the camera; the input step of inputting the zoom control command for the camera; and the electronic zoom processing step of executing the electronic zoom processing for the image displayed in the display step in accordance with the zoom control command for the camera input in the input step.

Furthermore, according to an another aspect of the present invention, there is provided a storage medium storing a program of a client of a camera control system for controlling a camera by outputting a control command to a camera server from a client via a network, the programs comprising steps of: displaying an image picked up by the camera; and executing the electronic zoom processing of a displayed image in accordance with the input zoom control command for the camera.

Furthermore, according to an another aspect of the present invention, there is provided a storage medium storing a program of a client of a camera control system for controlling a camera by outputting a control command to a camera server from a client via a network, the program comprising steps of: displaying an image picked up by the camera; and displaying a frame showing the display area of an image controlled by the input zoom control command for the camera by superimposing the frame to a display image.

Furthermore, according to an another aspect of the present invention, there is provided a storage medium storing a program of a client of a camera control system for controlling a camera by outputting a control command to a camera server from a client via a network, the program comprising steps of: displaying an image picked up by the camera; and predicting an image to be displayed after controlled in accordance with the input control command for the image-pickup direction of the camera and moving and displaying the area of an image displayed when the control command for the image-pickup direction of the camera is input, according to the predicted image.

Other objects and features of the present invention will become more apparent from the following specification and drawings.

BRIEF DESCRIPTION OF THE DRAWINGS

FIG. 11B is an illustration showing the display of a window after a control command is input;

DESCRIPTION OF THE PREFERRED EMBODIMENTS

Embodiments of the present invention are described below by referring to the accompanying drawings.

Figure 1:
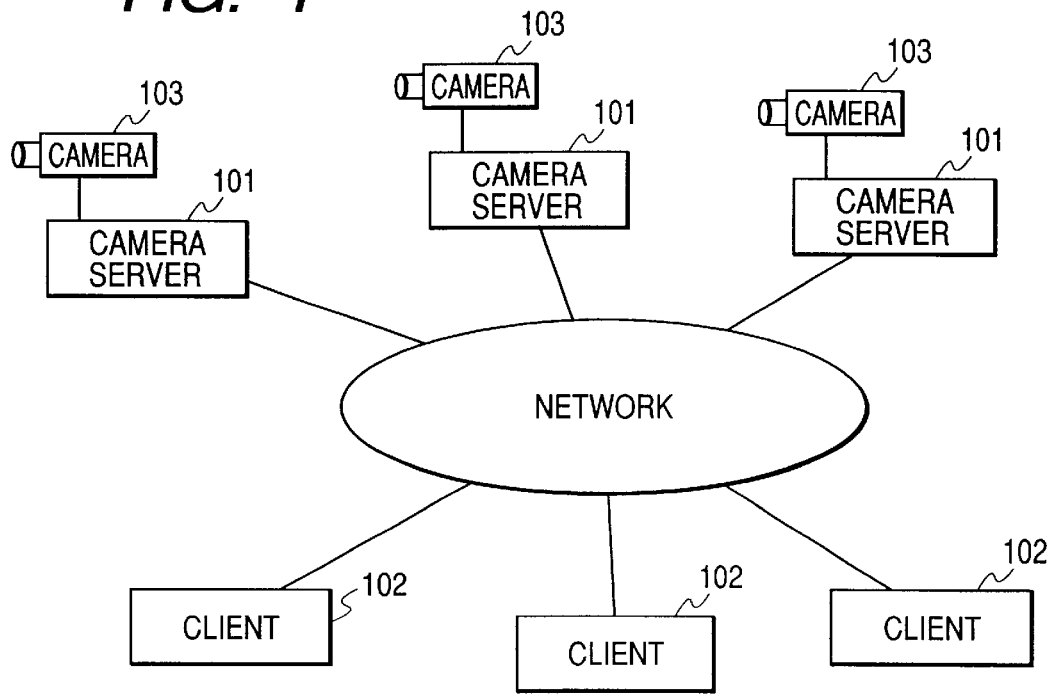
FIG. 1 is an illustration showing a camera control system of the present invention.

FIG. 1 is an illustration showing the first embodiment of typical embodiments of a camera control system, in which symbol 101 denotes a camera server, 102 denotes a client, and 103 denotes a camera. The camera 103 makes it possible to control the zoom by controlling the image pickup direction of a pan-tilting head or the like and the pulse value of a not-illustrated zoom lens in accordance with an external command.

The camera server 101 and client 102 are respectively constituted with an information processor such as a computer and connected to the internet or a network such as an intranet. The camera system of this embodiment makes it possible to view an image picked-up by the camera 103 at the client 102 because a request is sent to the camera server 101 from the client 102 via a network and when the request is received, video data is delivered to the client 102 from the camera server 101. Moreover, a camera control command is sent by the client 102 to the camera system, which enabling the camera system to operate the zoom and pan-tilting head of the camera 103. The client 102 can select a camera server to be accessed out of a plurality of the camera servers.

Figure 2:
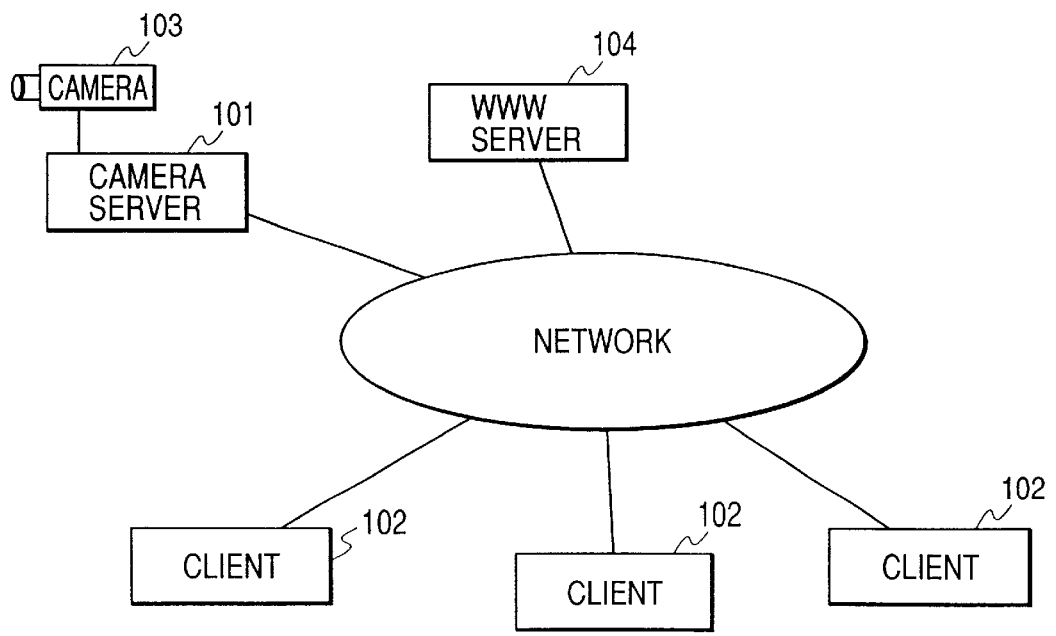
FIG. 2 is an illustration showing a camera control system of the present invention.

FIG. 2 shows a modification of the camera control system in FIG. 1 and shows a structure using the widely-spread Web art together, in which a WWW (World Wide Web) server 104 connected to a network is necessary. A link showing with which address connection with a camera server is realized is set to the Web page data in the WWW server 104 and thereby, connection with a desired camera server is easily realized.

Moreover, in FIG. 1, for connection with a WWW system on the internet, each camera server functions as a WWW server. Moreover, the software of a WWW browser is incorporated into each client 102 and communication is performed between the clients 102 in accordance with the HTTP (Hyper Text Transfer Protocol).

The WWW accesses servers using other protocols directly or through a gateway and finally forms these results into a hyper text to display it for users. That is, the information of purposed data is provided for a WWW server which is a destination for storing document data and video data from a WWW browser in accordance with the URL (Universal Resource Locator) showing the storage destination of the purposed data. The WWW server sends corresponding document data and image data to a WWW browser in response to the information.

Figure 3:
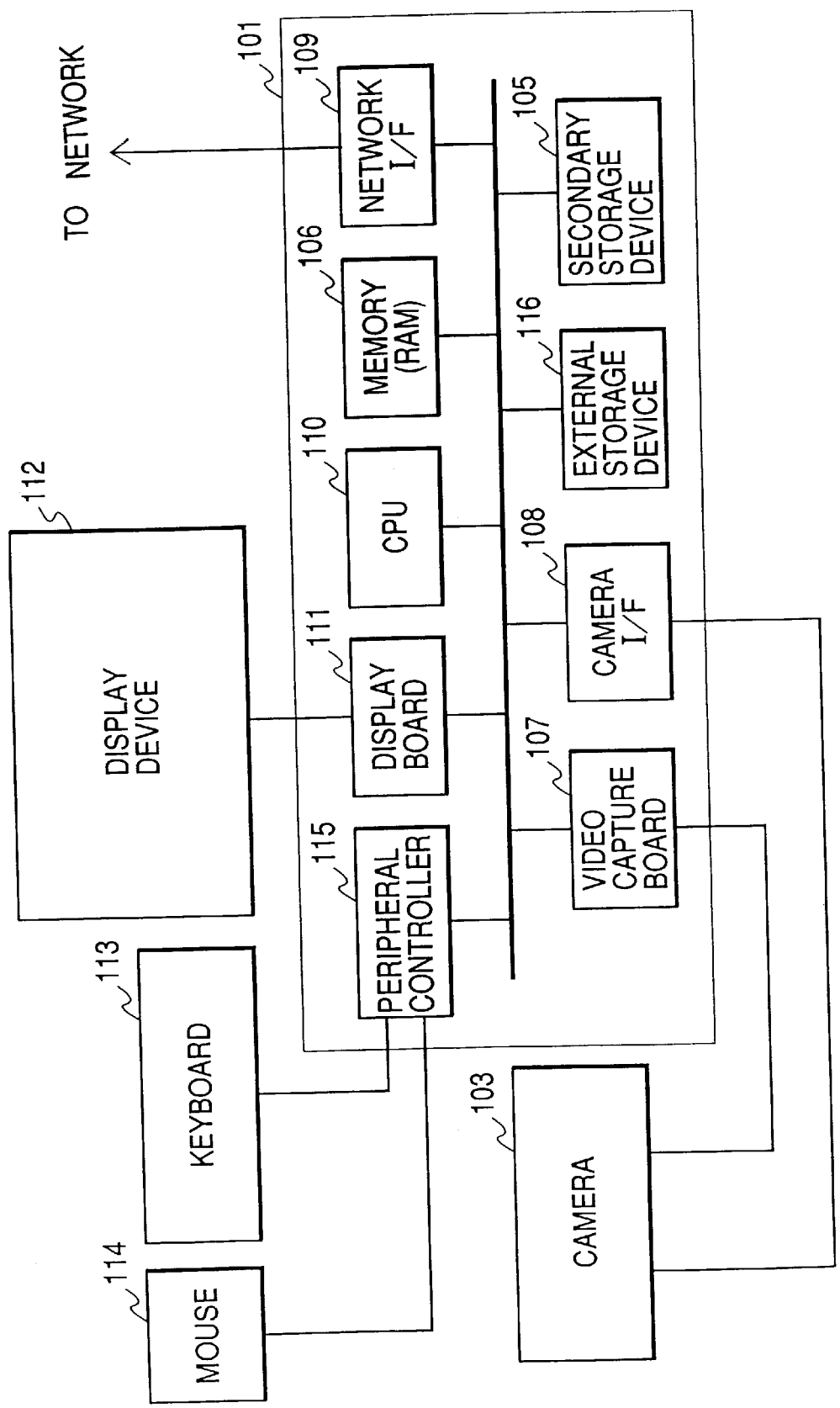
FIG. 3 is a block diagram of a camera server of the present invention.

FIG. 3 shows an example of the hardware structure of the camera server 101 and camera 103. In FIG. 3, the hardware structure is constituted with a secondary storage device 105 such as a hard disk or ROM storing a predetermined program, a memory (RAM) 106, a capture board 107 for capturing video data from a camera 103, a camera I/F 108 for sending a control command to the camera 103, a network I/F 109 for connecting a network with a camera server, a CPU 110 for executing various processings in accordance with a program, and an external storage device 116 for loading a program for an external unit.

A keyboard 113 and a mouse 114 can input a control command when the camera 103 is controlled at the camera server-110 side. A peripheral controller 115 obtains signals from the keyboard 113 and mouse 114. Moreover, a video signal picked up by the camera 103 is converted into a predetermined signal through a display board 111 and an image is displayed by a display unit 112 in accordance with the converted signal.

The camera 103 is provided with a not-illustrated zoom lens for optically controlling an image-pickup angle of view to control the image-pickup angle of view by changing positions (pulse values) of the zoom lens in the image pickup direction. Moreover, the zoom lens can be controlled by the CPU 110. Furthermore, the camera 103 is provided with a tripod head for moving the pickup directions of the camera 103 and it can be also controlled by the CPU 110.

Figure 4:
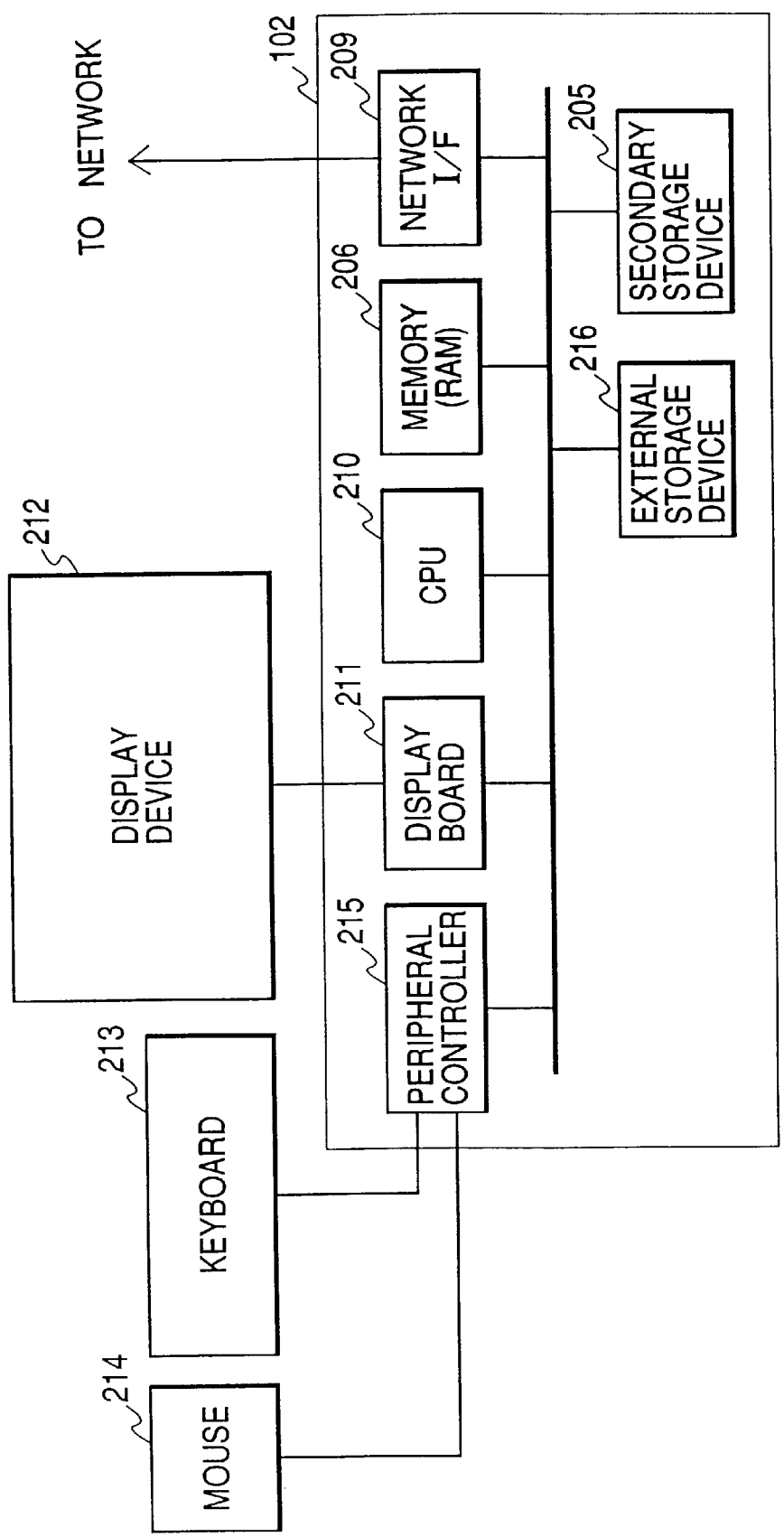
FIG. 4 is a block diagram of a client of the present invention.

FIG. 4 shows an exemplary hardware structure of the client 102. The client 102 is constituted with a secondary storage device 205 such as a hard disk or ROM storing a program, a memory (RAM) 206, a network I/F for connection with a network, a CPU 210 for executing various processings in accordance with a program, an external storage device 216 for loading a program from an external unit, a mouse 214 and a keyboard 213 for inputting control commands for the camera 103 connected to the camera server 101 via a network, a peripheral controller for capturing an input signal through the mouse 214 or keyboard 213, a display unit 212 for displaying an image picked up by a camera, and a display board 211 for converting a signal transmitted from the camera server 101 into a predetermined signal in order to display it on the display unit 212.

Figure 9:
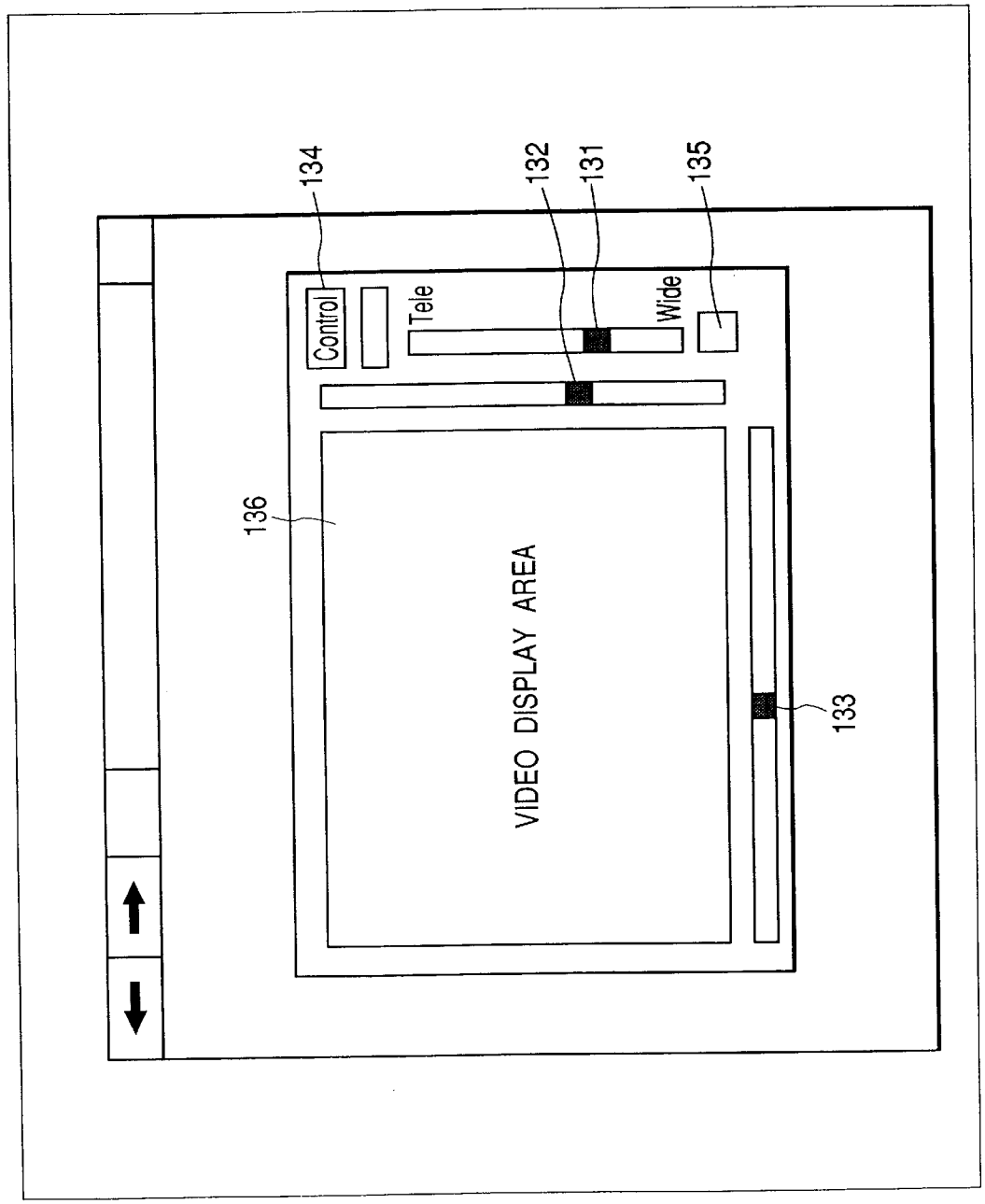
FIG. 9 is an illustration showing a display screen of a display unit 212 of the present invention.

FIG. 9 shows a window to be displayed on the display unit 212 of the client 102 of this embodiment. In FIG. 9, a video display area 136 displays an image photographed by the camera 103. Moreover, a control key 131 controls the zoom of the camera 103. Zoom control can be executed in the telephoto-direction by moving the control key 131 upward with the mouse 214 or the like and in the wide-direction by moving the control key 131 downward.

Moreover, a control key 132 is used to control the tilt direction in the pickup direction of the camera 103. By virtically moving the control key 132 with the mouse 214 or the like, it is possible to virtically move the pickup direction of the camera 103 in accordance with the virtical movement of the control key 132.

Moreover, a control key 133 is used to control the pan-direction in the pickup direction of the camera 103. By horizontally moving the control key 133 with the mouse 214 or the like, it is possible to horizontally move the pickup direction of the camera 103 in accordance with the horizontal movement of the control key 133.

Symbol 134 denotes a button for requesting the control right of the camera 103 to the camera server 101 and 135 denotes a button for backlight correction.

The window in FIG. 9 serves as a GUI (Graphical User Interface) for inputting a camera control command as described above, in which an image is displayed in the video display area 136 in accordance with the video data obtained from the camera server 101 and a designation from each of the controls 131 to 133 or an operation button is sent to the camera server 101.

Figure 5:
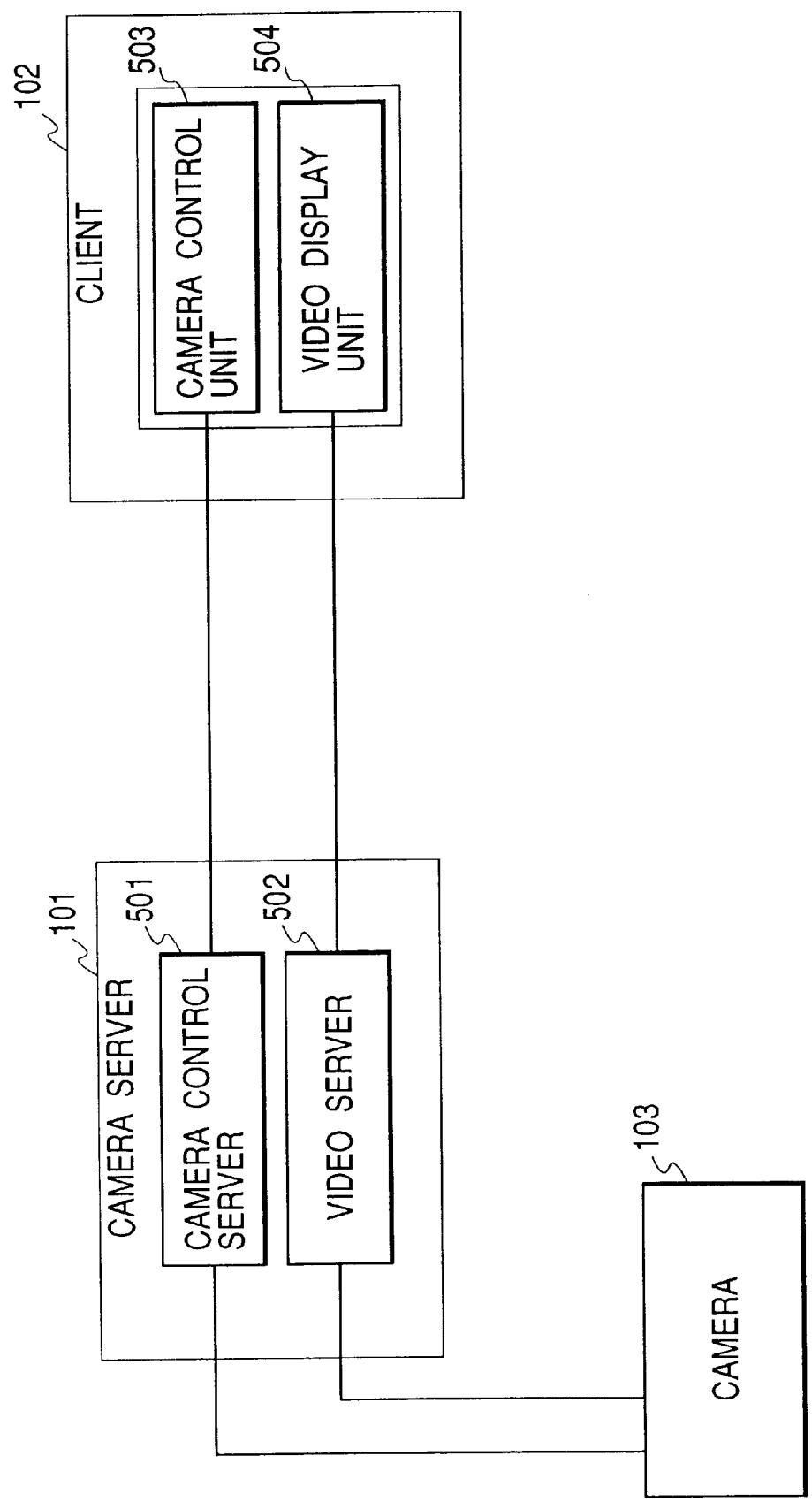
FIG. 5 is an illustration showing the structure of the software of a camera control system of the present invention.

FIG. 5 is a schematic illustration of the portion for constituting the software of the camera control system of this embodiment. In FIG. 5, the camera server 101 includes two modules such as a camera control server 501 for controlling the camera 103 in accordance with a camera control command and a video server 502 for capturing a video signal picked up by the camera 103 and delivering an image to the client 102 currently accessed.

The client 102 includes a camera control unit 503 corresponding to a camera control command and a notice for the state of the camera 103 transmitted from the camera server 102 and a video display unit 504 for displaying a camera image.

Figure 6:
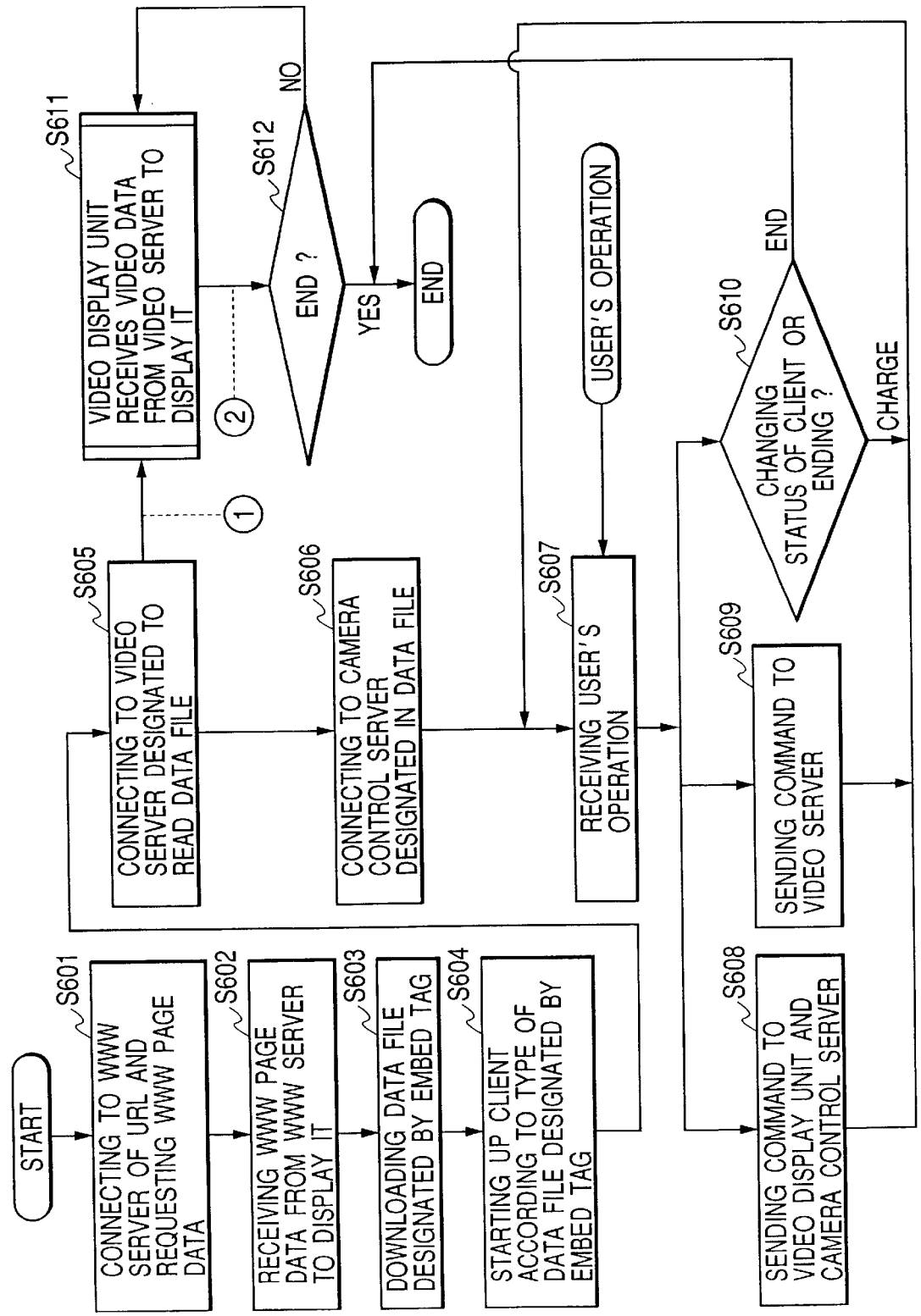
FIG. 6 is a flowchart showing the operation processing at the client side of the present invention.

FIG. 6 is a flowchart showing the operation processing by the CPU 210 at the client 102 side in detail. In step S601, the Web browser of the program provided for the secondary storage device 205 connects with a WWW server corresponding to a designated URL and requests Web page data described in the form of an HTML (Hyper Text Markup Language). Then, in step S602, the Web browser receives the Web page data from the WWW server and displays the data on the display unit 212.

In the case of this embodiment, the following embed tag or hyperlink is included which shows the information to be connected to the camera server 101 connected to a network as the information for Web page data.

<embed src="cameral.wvp" width=480 height=320>

Then, in step S603, the Web browser downloads the data file designated by an embed tag (in the above case, "cameral.wvp" file) by accessing a WWW server.

In step S604, the Web browser starts up a program corresponding to the identifier of the downloaded data file, that is the program at the client side of the camera control system of this embodiment (camera control unit 503 and video display unit 504).

In step S605, the started program reads the downloaded data file, displays objects on the display unit 212 in accordance with the address of each camera server 101 and the information for a connection port described in the data file, and connects an object out of the displayed objects to the video server 502 of the camera server 101 designated by a user.

In step S611, the video display unit 504 is started (actually, a thread or process is started) as a program for performing the processing after connected with the camera server 101 and an image picked up by the camera 103 is displayed on the display unit 212 by the program whenever video data is sent from the video server 502 until completion of connection with the camera server 101. When the connection with the camera server 101 is completed in step S612, display of the picked-up image is completed.

Moreover, in step S606, the camera control unit 503 for controlling the camera 103 connects with the camera control server 501 in accordance with the address of the camera control server 501 and the information for a connection port described in the downloaded data file.

In step S607, it is assumed that a control command is input from a user by operating the mouse 214 or keyboard 213. Then, in step S608, when the input control command relates to camera control, the camera control unit 503 outputs a command to the camera control server 501 and communicates the command to the video display unit 504 if necessary.

Moreover, in step S609, when the control command by the user is a command related to an object to be processed by the video server 502, the video display unit 504 outputs a command to the video server 502.

Furthermore, in step S610, when the control command by the user is a command for changing states of the client 102

(for example, a command for changing video display sizes), the internal state of the client 102 is updated by a not-illustrated OS of the client 102. Moreover, to complete user operations, programs related to operations of the client (camera control unit 503 and video display unit 504) are successively completed. When the processings in steps S608 to S610 are completed, step S607 is restarted to wait for the next operation input by the user. When a control command is input, processings same as those in steps S608 to S610 are performed.

Figure 12:
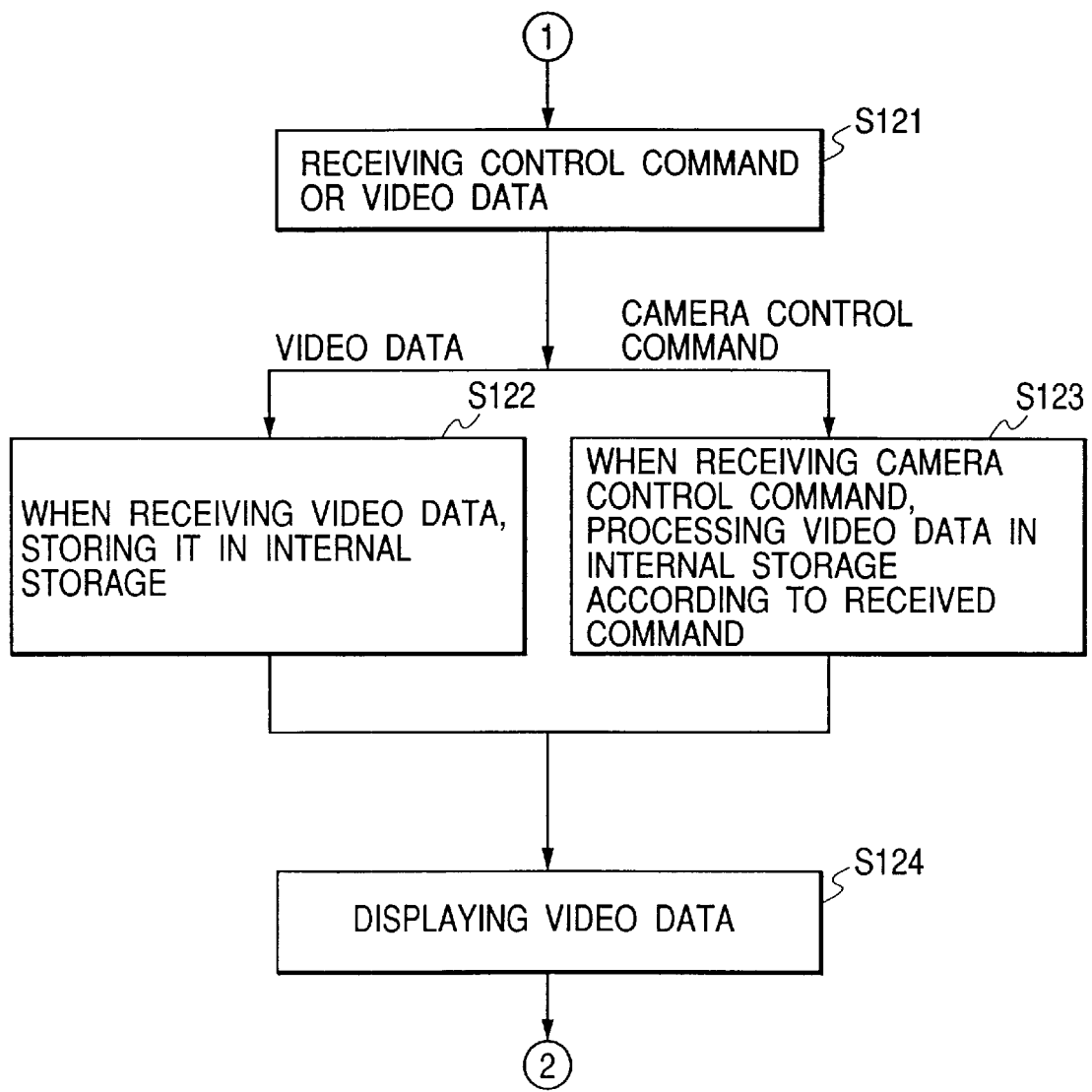
FIG. 12 is a flowchart showing the operation processing at the client side of the present invention.

FIG. 12 is a flowchart showing the processing in step S611 in FIG. 6 in detail.

First, video data is received from the video server 502 via a network in step S121 or a camera control command is received from the camera control unit 503 in step S608 in FIG. 6.

Then, when the video data is received from the video server 502, it is stored in a memory 206 in step S122 and the stored image is displayed in step S124.

Moreover, when the camera command is received, the video data stored in a RAM is processed in accordance with the camera control command in step S123.

Figure 7:
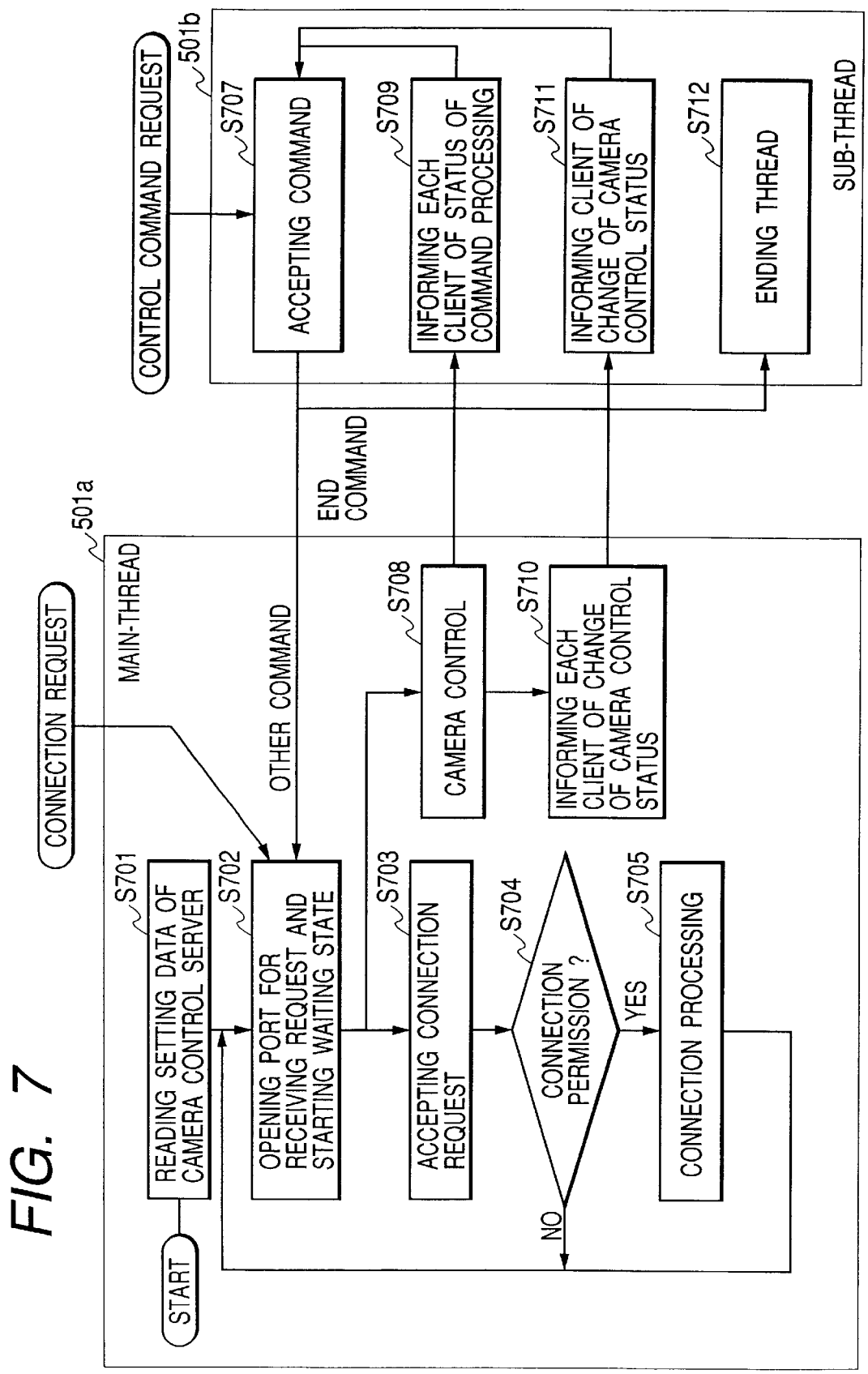
FIG. 7 is a flowchart showing the processing of the camera control command at the camera server side of the present invention.

FIG. 7 is a flowchart showing the operation processing by the CPU 110 of the camera control server 501 in the camera server 101 corresponding to the operation processing of the client 102 in detail. In FIG. 7, the camera control server 501 is constituted with a main thread 501a for performing main processing and a sub-thread 501b for transferring a command to and from the currently-connected client 102. In FIG. 7, only one sub-thread 501b is shown. However, when a plurality of clients 102 are accessed, each of a plurality of sub-threads performs the processing for its corresponding client 102.

In step S701, the camera control server 501 first reads the operation setting information of the camera control server 501 from a specific file (or a system data base such as a registry depending on an OS) provided for the secondary storage device 105 when started, and starts operations in accordance with the information.

In step S702, the port for accepting a request from a client is opened and a request acceptance state is set.

When a request (connection request or operation command request) is accepted, step S703 is started if the request is a connection request to decide whether to permit the connection with the camera server 101 corresponding to the client 102 outputting the request. In step S704, when it is decided that the connection is not permitted for the client outputting the request, an error code showing rejection of the connection is returned and step S702 is restarted. However, when it is decided that the connection is permitted, step S705 is started to generate the sub-thread 501b for accepting a command from a client as connection processing and enter the client and then, step S702 is restarted.

In step S707, a command is accepted from the client 102 whose connection is permitted by the sub-thread 501b and a received camera control command is delivered to the main thread 501a. The main thread 501a receives the camera control command in step S702 and confirms that it is a camera control command, and then step S708 is started to perform the control of the camera 103.

In step S709, the sub-thread 501b outputs a code showing whether the camera control is properly performed to the client 102 outputting the camera control request. Moreover, the main thread 501a communicates the state changed by operating a camera (for example, value of pan-tilting zoom) to the sub-thread 501b corresponding to every client 102 currently connected in step S710. The sub-thread 501b communicates the change of camera control states to each client in step S711.

Furthermore, when the sub-thread 501b receives a command showing the completion of connection from the corresponding client 102 in step S712, it communicates the command to the main program and completes the thread of its own in step S710.

To handle a control command, a request for assigning a camera control right may be requested before a specific control command is output. This has an advantage of preventing the confusion under a state in which a plurality of persons request a camera operation. In this case, a command for requesting the camera control right is first output from the client 102 and thereby, the camera control server 501 selects rejection, assignment, or turn waiting from the present camera-control-right assignment state and responds to the client.

For example, the camera control right is determined in accordance with shorter time of a predetermined time and the time until a client completes connection. When a client having the control right loses the control right, the control right is assigned to the next turn waiting person. The client can control the camera 103 only from the time when obtaining the control right up to the time when losing it. The camera control server 501 only accepts an operation command from a client provided with the camera control right.

Figure 8:
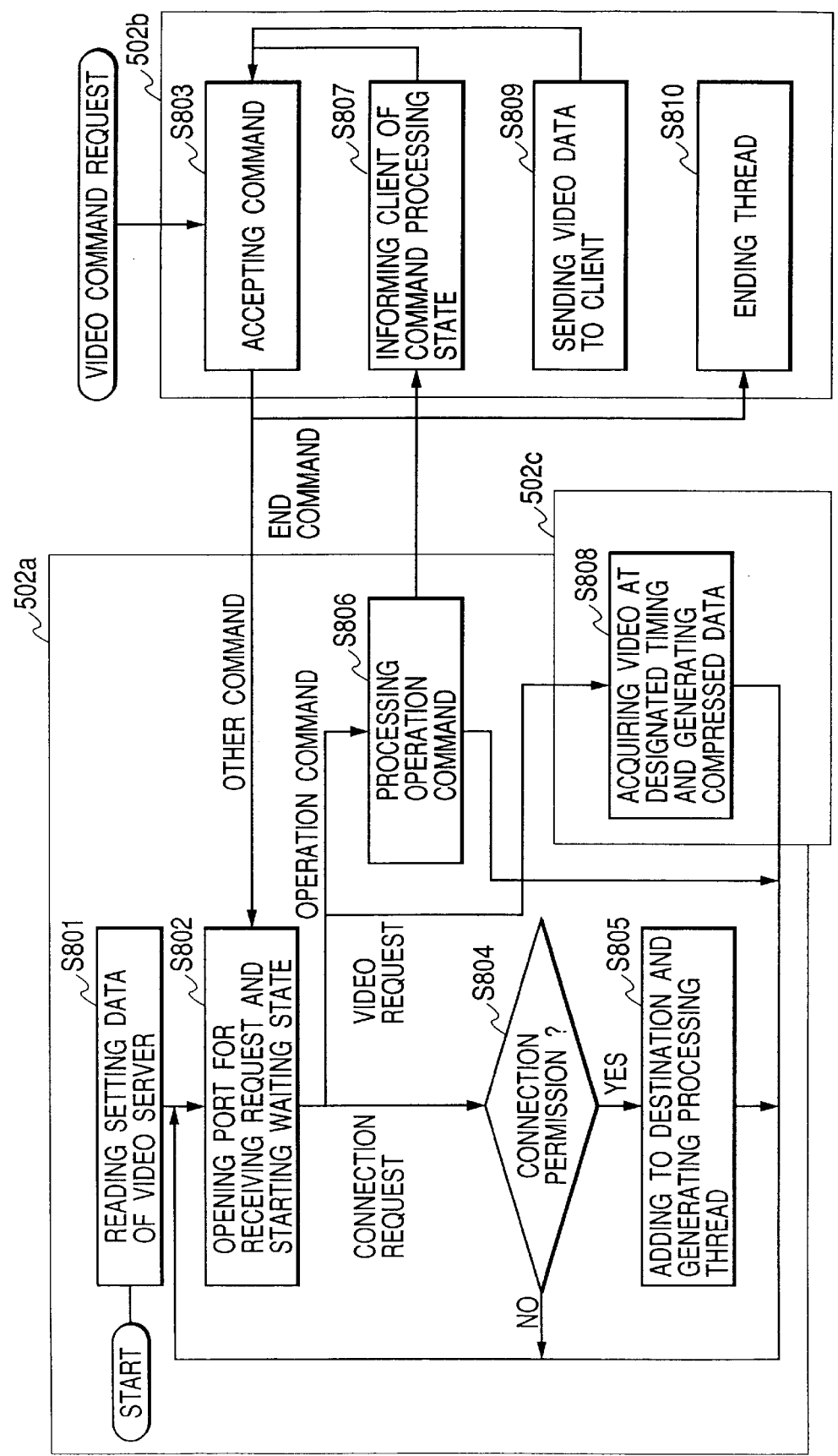
FIG. 8 is a flowchart showing the image transmission processing at the camera server side of the present invention.

FIG. 8 is a flowchart showing the operation processing by the video server 502 in the camera server 101. The video server 502 is constituted with a main thread 502a for performing main processing, a sub-thread 502b for transferring a command to and from the currently-connected client 102, and an image-processing thread 502c for processing images. FIG. 8 shows only one sub-thread 501 similarly to the case of FIG. 7. However, when a plurality of clients 102 currently accessed are present, each of a plurality of sub-threads performs the processing for its corresponding client 102.

In step S801, the video server 502 first reads the operation setting information for the video server 502 from a specific file (from a system data base such as a registry depending on an OS) stored in the secondary storage device 105 when started and starts operations in accordance with the information. In step S802, the server 502 generates the image-processing thread 502c for capturing and encoding images (the image-processing thread 502c is stopped when the video server 502 is started), opens the port for accepting a request for video data from the client 102, and sets a request acceptance state.

In step S803, a request (such as connection request or command request) is received from the client 102. When it is decided in step S802 that the request is a request for connection with the camera server 102, step S804 is started to decide whether to permit the connection. When it is decided that the connection with the client 102 is not permitted, an error code showing rejection of the connection is returned and step S802 is restarted.

When it is decided that the connection with the client 102 is permitted, step S805 is started to generate the sub-thread 502b for accepting a command from the client 102 and moreover register the connected client 102. When the image-processing thread 502c is stopped, start of operations is designated and step S802 is restarted.

The generated sub-thread 502b accepts an operation command from a corresponding client in step S803 as described above and delivers the command to the main thread 502a for processing images. The main thread 502a receives the command in step S802, starts the processing in step S806 for the operation command, changes the settings for capturing, encoding, and transmitting images, and communicates the result (code showing whether to succeed or fail in the operation) to the sub-thread 502b receiving a command request. In step S807, the sub-thread 502b returns the result to the client 102.

Moreover, in step S808, the main thread 502a captures video data at a predetermined time interval by using an image capture board and converts the video data into compressed data. Moreover, the main thread 502a communicates the compressed data to every sub-thread 502b. In step S809, each sub-thread 502b delivers video data (dynamic image) to each connected client 102.

When receiving the next video-frame transmission request (this is generally returned when the client 102 completes the acceptance of compressed video data), the sub-thread 502b sets the flag for video-frame transmission request. Moreover, when receiving a command showing completion of connection from the client 102, the sub-thread 502b communicates the command to the main program and moreover, completes the thread of its own in step S810. Then, when start of every sub-thread 502b is completed, start of the main thread 502a is also completed.

Figure 15:
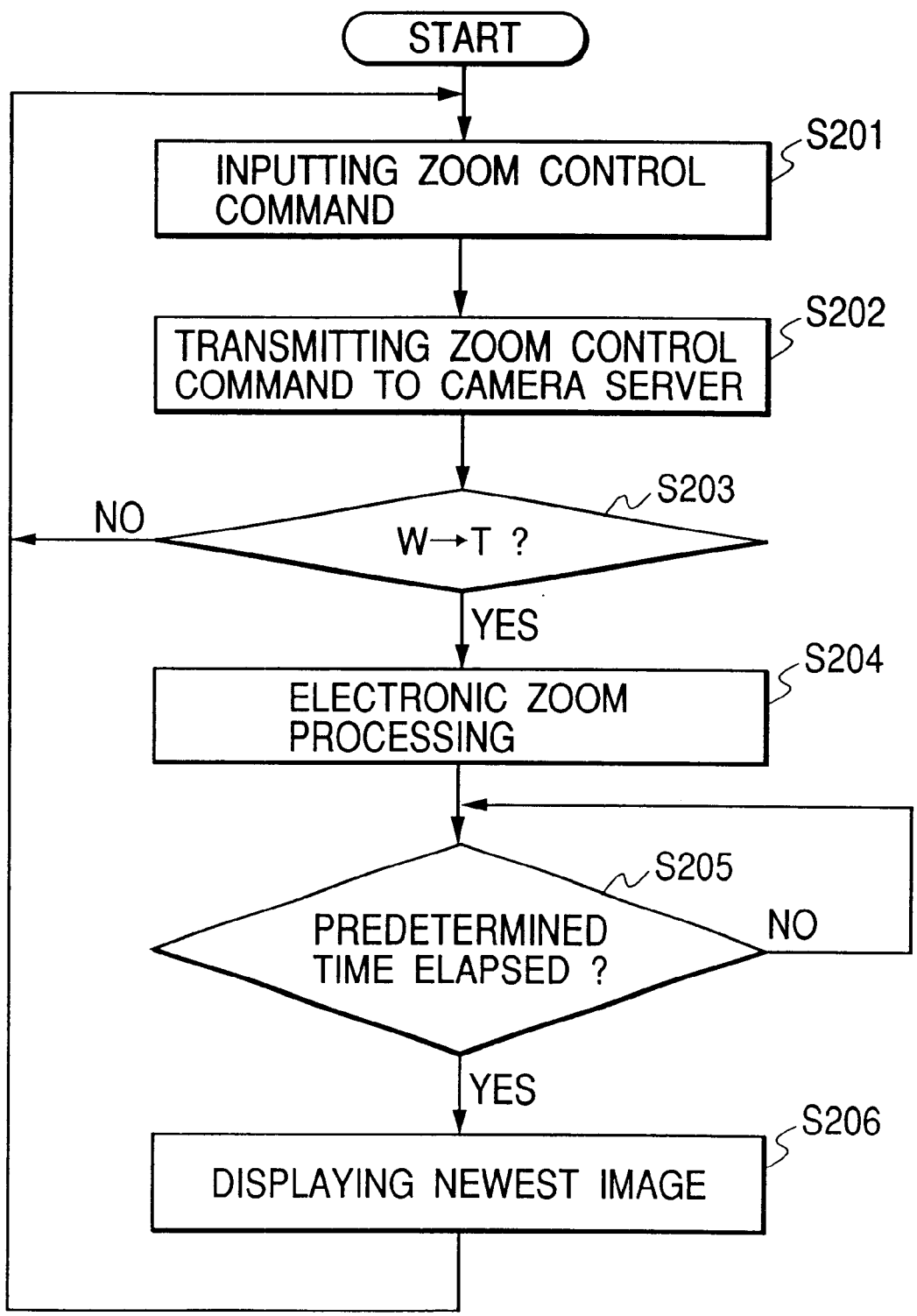
FIG. 15 is a flowchart showing the operation processing of the client of the first embodiment.

FIG. 15 is a flowchart showing the operation processing when a zoom control command is input to the client 102.

Figure 13A:
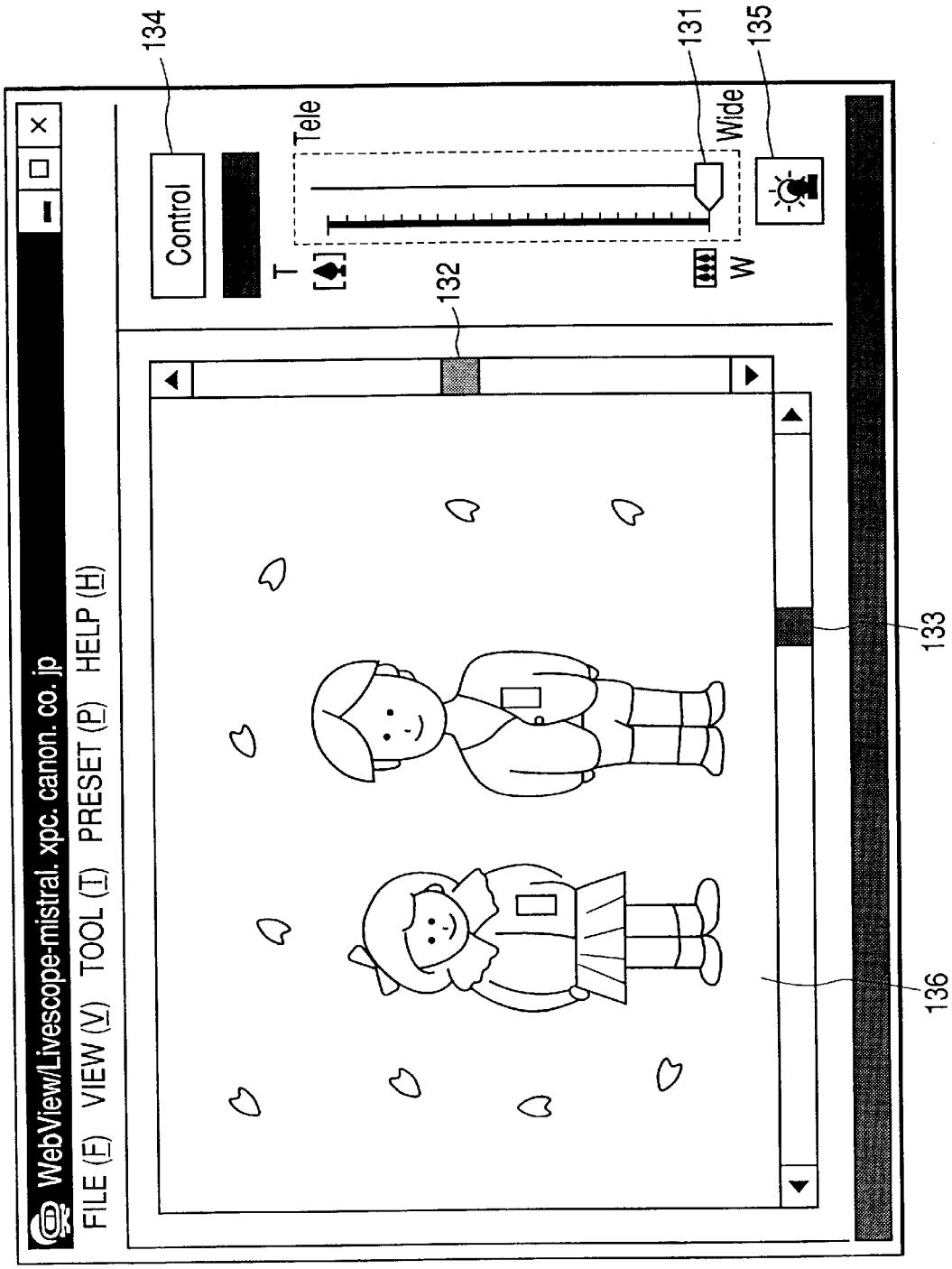
FIG. 13A is an illustration showing the display of a window before a control command is input.
Figure 13B:
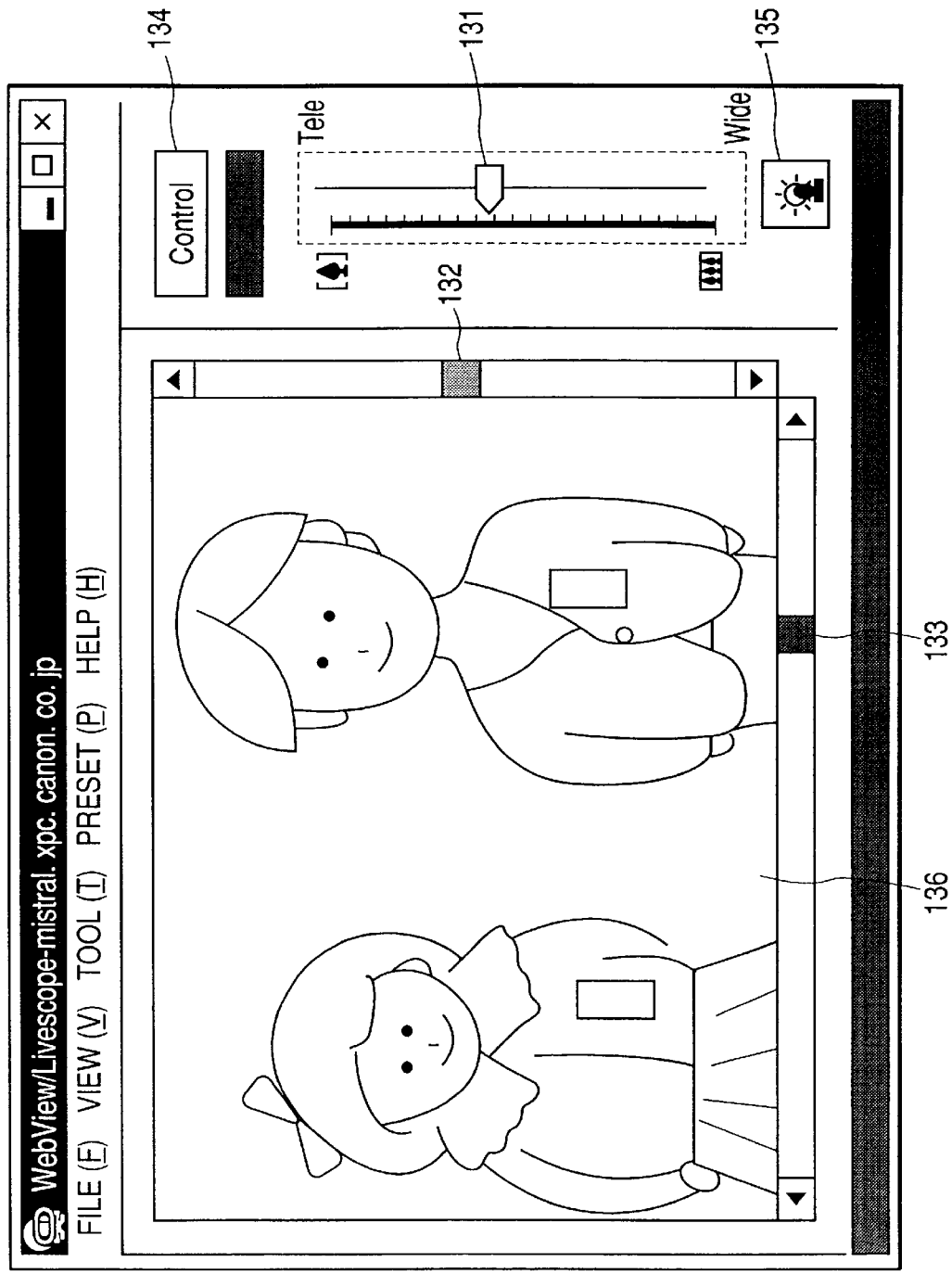
FIG. 13B an illustration showing the display of a window after a control command is input.

When a zoom control command is input by user's moving the control key 131 shown in FIGS. 9 and 13A and 13B through the operation of the mouse 214 in step S201, the zoom control command is transmitted to the camera server 101 in step S202.

When the input zoom control command is a command to be controlled from wide-side to telephoto-side in step S203, step S204 is started. However, when the input zoom control command is a command to be controlled from telephoto-side to wide-side, the processing based on the flowchart is not performed.

Moreover, in step S204, as the zoom control command is input, a frame image (static image) then displayed in the video display area 136 is displayed by executing the electronic zoom processing corresponding to the zoom control command. In this case, the electronic zoom is a publicly-known art for enlarging and displaying an image by applying electronic processing to a part of the image. For example, as shown in FIG. 13A, when a zoom control command in the telephoto-direction is input from the wide-direction by moving the control key 131 from the state in which an image is wide-displayed, the electronic zoom processing is performed as shown in FIG. 13B and the processed image is displayed.

When a predetermined time elapses after the zoom control command is input in step S205, that is, the time equal to the time since the zoom control command was transmitted to the camera server 101 elapses, the display of the image in the video display area 136 is changed from the image undergoing the electronic zoom processing to the latest image transmitted from the camera server 101 in step S204. The predetermined time is assumed as a time longer enough than the time until an image zoom-controlled at the camera server side is received by the client 102 side. Moreover, the predetermined time is clocked by the fact that the time is counted by the CPU 210.

As described above, the image displayed in the video display area 136 is electronic-zoom-processed and displayed until a zoom-controlled image is received from the camera server 101 after a zoom control command is input from the camera 103. Therefore, because it seems that zoom control can be executed as if data is not delayed due to the communication rate of a network, it is possible to provide a camera control system having a high manipulability.

Then, the second embodiment of the present invention is described below.

This embodiment changes the display of the image in the video display area 136 from a frame image (static image) undergoing the electronic zoom processing to the latest image transmitted from the camera server 101 when a zoom-control completion report is received from the camera server 101. Because the structure of the camera control system of this embodiment is the same as the case of the first embodiment, description of the structure is omitted.

Figure 16:
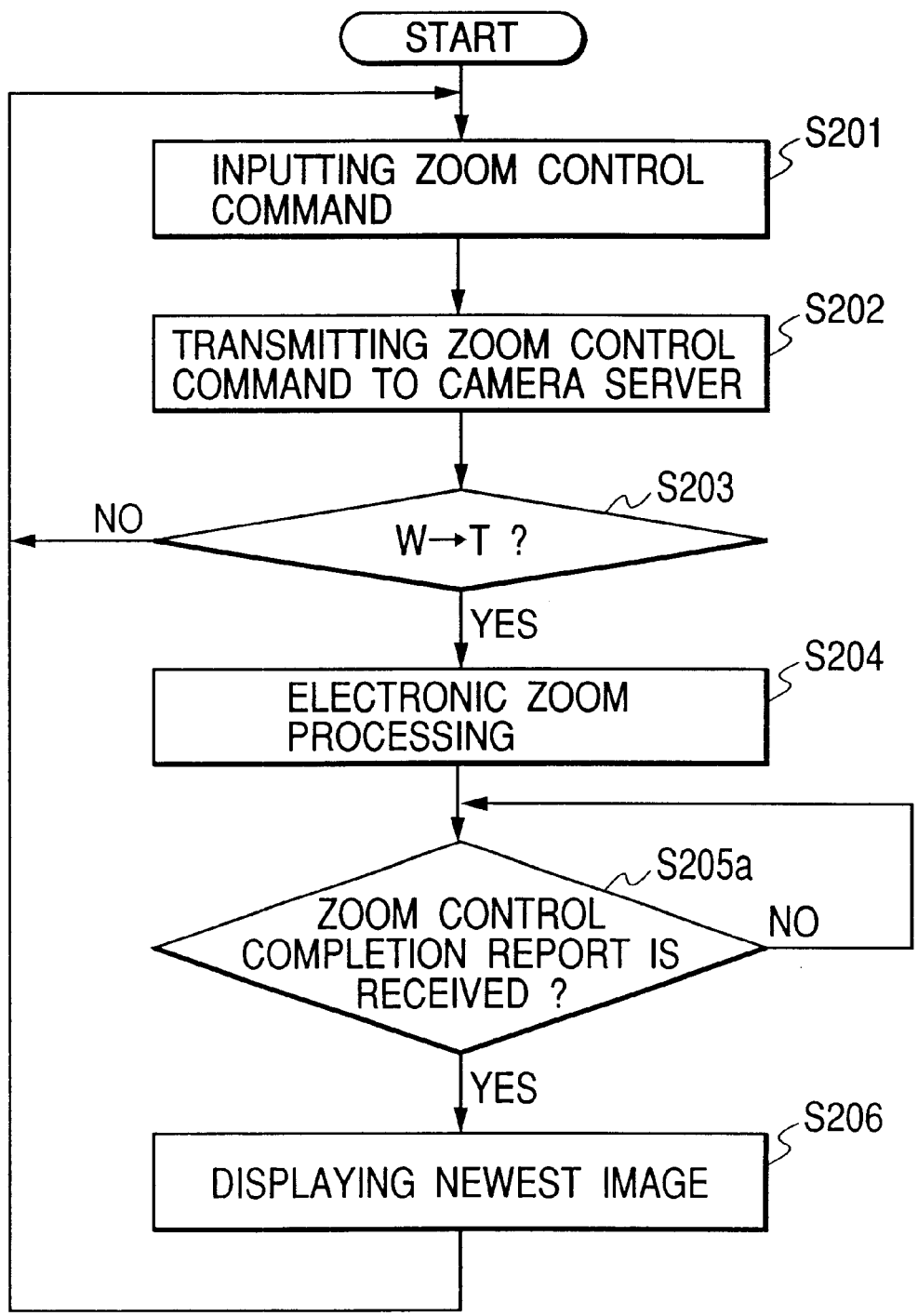
FIG. 16 is a flowchart showing the operation processing of the client of the second embodiment.
Figure 17:
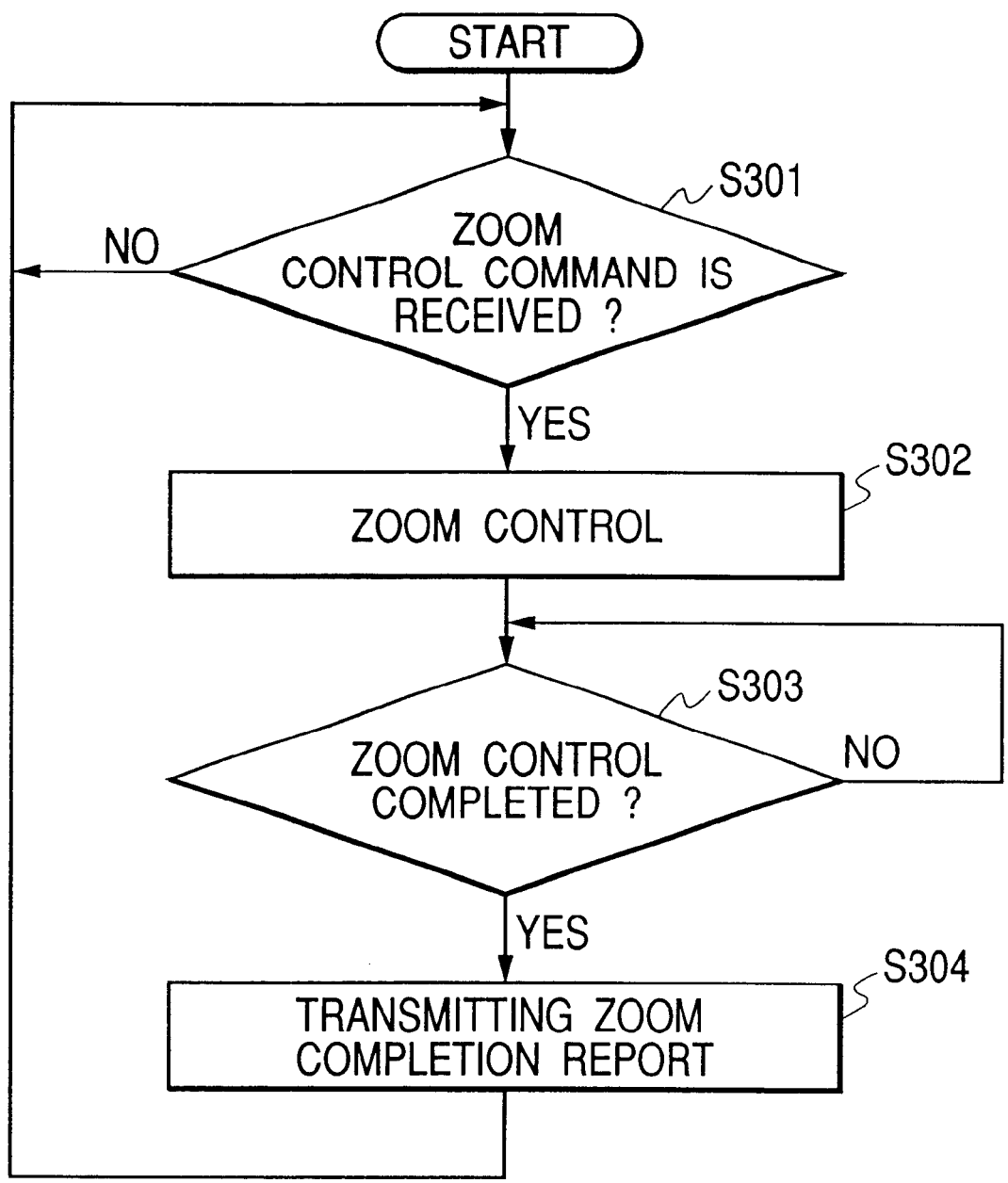
FIG. 17 is a flowchart showing the operation processing of the camera server of the second embodiment.

FIG. 16 shows a flowchart of the operation processing by the CPU 210 of the client 102 and FIG. 17 shows a flowchart of the operation processing by the CPU 110 of the camera server 101. In FIG. 16, steps provided with the same symbol as that of the flowchart in FIG. 15 undergoes the same processing as that of the flowchart in FIG. 15. Therefore, description of those steps is omitted.

When a zoom control command is input from the client 102 in step S301 in FIG. 17, step S302 is started to control the zoom lens of the camera 103 in accordance with the control command. Moreover, when the zoom control command is completed in step S303, step S304 is started to transmit a zoom completion report to the client 102.

When a zoom-control completion report is received in step S205a in FIG. 16, step S206 is started to change the display of a frame image to which the electronic zoom processing is applied in step S204 to the display of an image based on the latest video data transmitted from the camera server 101.

As described above, also in the case of this embodiment, an image displayed in the video display area 136 is electronic-zoom-processed and displayed from the time when a zoom control command is input from the camera 103 up to the time when a notice showing that zoom control is completed is received from the camera server 101. Thus, because it seems that zoom control can be executed as if data is not delayed due to the communication rate of a network, it is possible to provide a camera control system having a very high manipulability.

Then, the third embodiment of the present invention is described below.

This embodiment uses the camera control system of the first embodiment and thereby, displays dynamic images by successively applying the electronic zoom processing to them in accordance with the latest video data sent from the camera server 101. The camera 103 is zoom-controlled by moving the position (pulse value) of a not-illustrated zoom lens provided for the camera 103 in the image-pickup optical-axis direction. In the case of this embodiment, however, pulse values of a not-illustrated zoom lens provided for the camera 103 are read by the camera server 101 together with the video data output from the camera 103 and moreover, always transmitted to the client 102 together with the video data.

Figure 18:
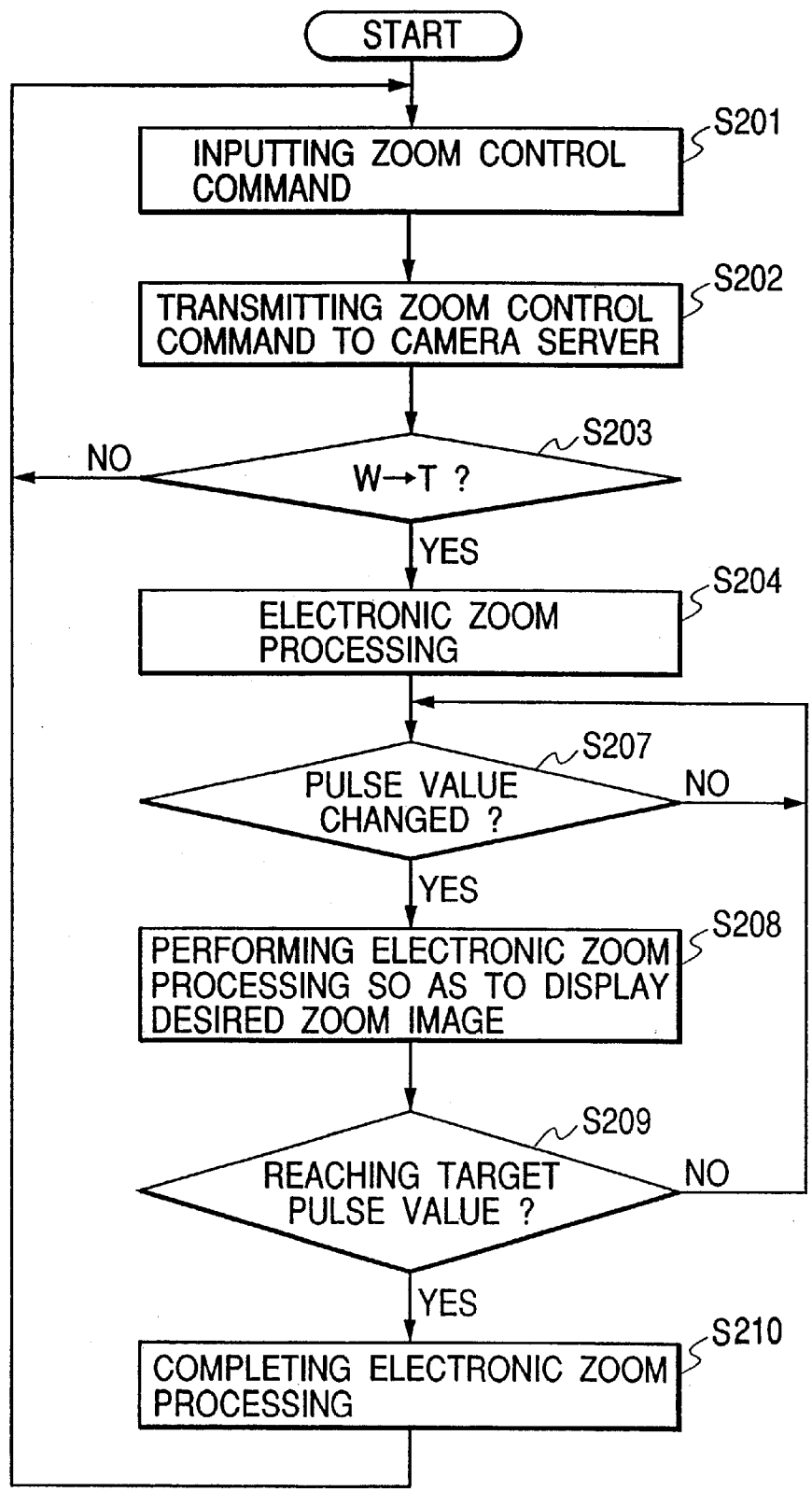
FIG. 18 is a flowchart showing the operation processing of the client of the third embodiment.

FIG. 18 is a flowchart of the operation processing by the CPU 210 of the client 102 of this embodiment. Because steps in FIG. 18 provided with the same symbol as those of the flowchart in FIG. 15 undergoes the same processings as those of the flowchart in FIG. 15, description of those steps is omitted.

In steps S201 to S204 in FIG. 18, the processings same as those in FIG. 16 by the first embodiment are executed. Moreover, when pulse values of a zoom lens transmitted from the camera server 101 together with video data are changed due to the zoom control of the camera 103 at the camera server 101 side in step S207 (that is, when optical zoom control is executed), zoom control is deviated to the telephoto-direction side from a desired zoom image if the electronic zoom processing in step S204 is directly performed. Therefore, in step S208, the electronic zoom control is performed to compensate the optical zoom control so that a desired zoomed image can be obtained. That is, a magnification to be set through electronic zoom is computed in accordance with the pulse value of a zoom lens obtained from the camera server 101.

That is, by performing the processings in steps S207 to S208, the degree of electronic zoom processing is lowered as the pulse value of the zoom lens of the camera 103 approaches a target value and electronic zoom processing is performed so as to raise the degree of optical zoom control by the zoom lens.

Then, when the pulse value of the zoom lens following video data reaches the target value, that is, when the zoom control by the zoom lens of the camera 103 is completed in step S209, the electronic zoom processing is completed in step S210.

As described above, also in the case of this embodiment, when a zoom control command is input, the electronic zoom processing is performed at the client 102 side and a desired zoom image can be obtained. Moreover, by obtaining the pulse value of a zoom lens to be changed through the zoom control of the camera server 101 together with video data, it is possible to change the degrees of zoom processing by electronic zoom in accordance with the pulse value. That is, even while performing the electronic zoom processing, it is possible to display an image of a desired zoom magnification by a dynamic image.

Then, the fourth embodiment of the present invention is described below.

This embodiment displays an area to be zoomed of an image displayed in the video display area 136 by a frame when a zoom control command is input to at the client-102 side. Because the structure of the camera control system of this embodiment is the same as that of the first embodiment, description of the structure is omitted.

Figure 19:
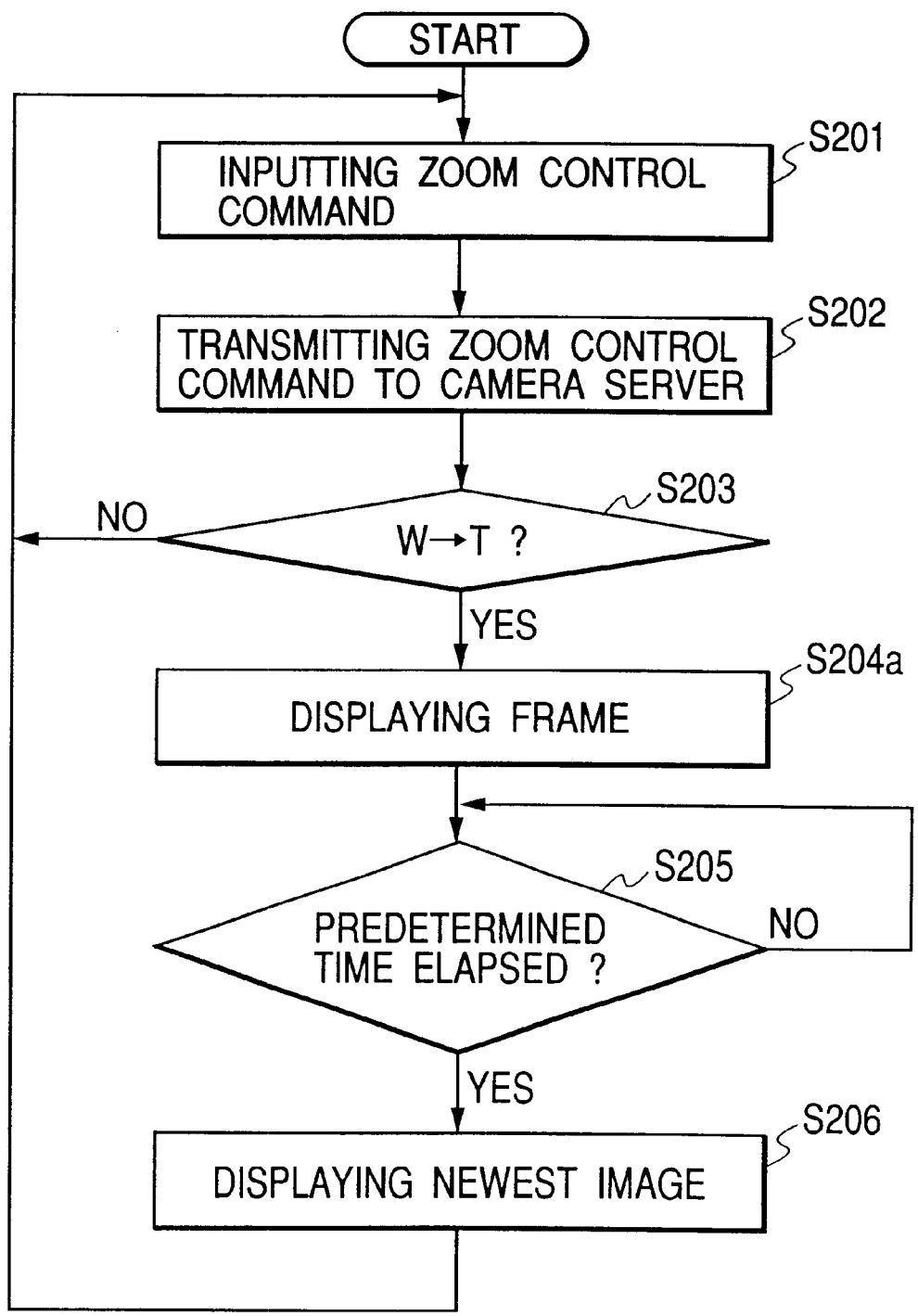
FIG. 19 is a flowchart showing the operation processing of the client of the fourth embodiment.

FIG. 19 is a flowchart of the operation processing by the CPU 210 of the client 102 of this embodiment. In FIG. 19, steps provided with the same symbol as those in FIG. 15 execute the same processings.

When a zoom control command is input when a user moves the control key 131 shown in FIGS. 9 and 13A and 13B by operating the mouse 214 in step S201, the zoom control command is transmitted to the camera server 101 in step S202.

When the input zoom control command is a command to be controlled from wide-side to telephoto-side in step S203, step S204a is started. When the zoom control command is a command to be controlled from telephoto-side to wide-side, the processing according to this flowchart is not performed.

Figure 11A:
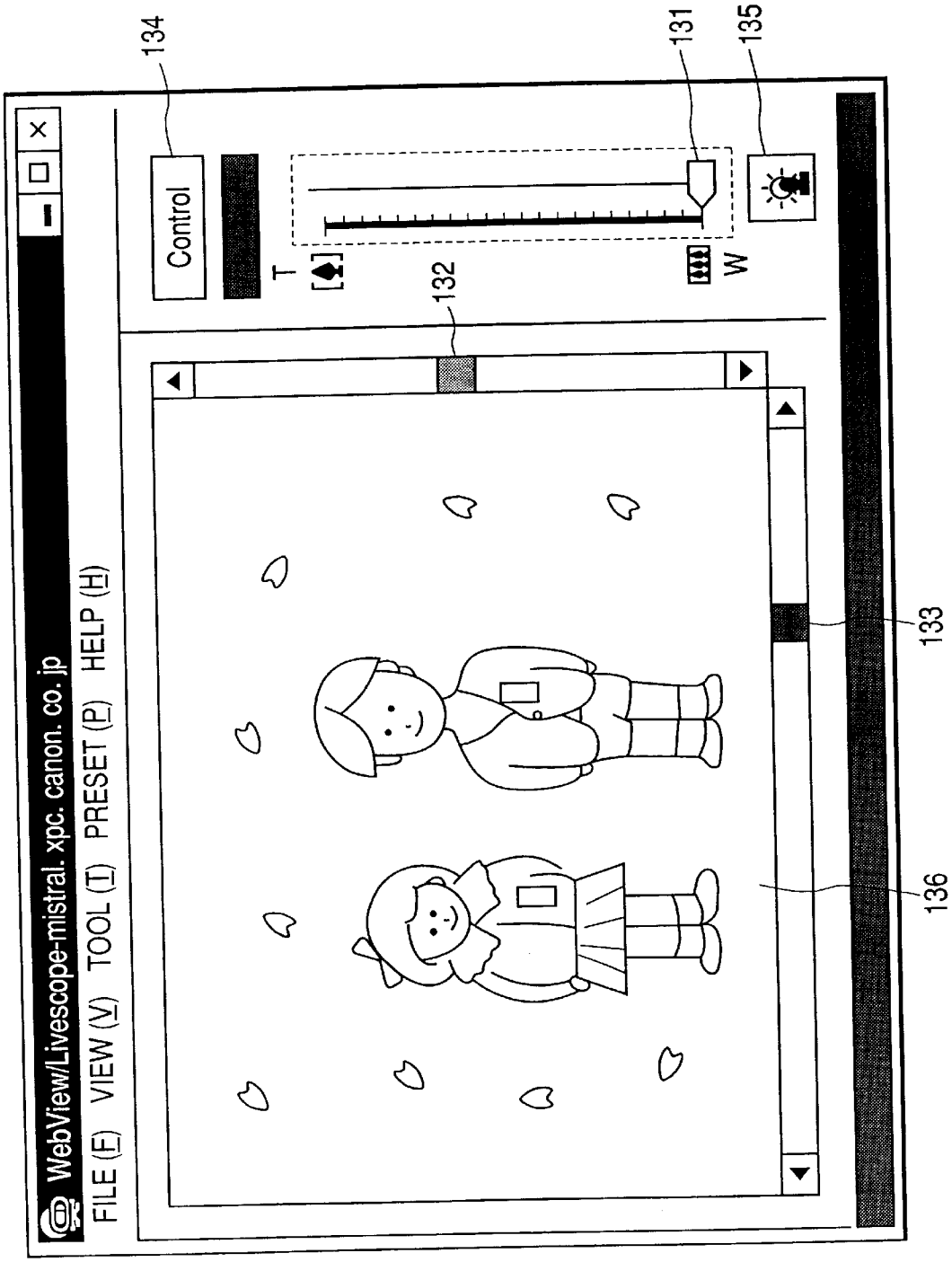
FIG. 11A is an illustration showing the display of a window before a control command is input.

In step S204a, an area to be zoomed of an image currently displayed in the video display area is computed in accordance with the input zoom control command to display the area by a frame. For example, FIG. 11A is a window display on the display screen of the display unit 212 before a zoom control command is input. In this case, when a zoom control for adjustment from wide-direction to telephoto-direction is input, a frame 139 for shown an area to be displayed through zoom is displayed on a frame image displayed when the zoom control command is input.

Moreover, the image when the control command is input and the frame 139 are displayed for a predetermined time until the predetermined time elapses in step S205. After the predetermined time elapses, step S206 is started to switch the display to an image transmitted from the camera server 101 after the current zoom control is completed.

As described above, because a frame to be zoomed is displayed on an image until an image already zoom-controlled after a zoom control command is input, it is possible to properly confirm the zoom-controlled image through a relatively simple processing. Moreover, because a frame image is displayed until an image zoom-controlled by the camera server 101 is displayed, it is not unsightly.

Figure 20A:
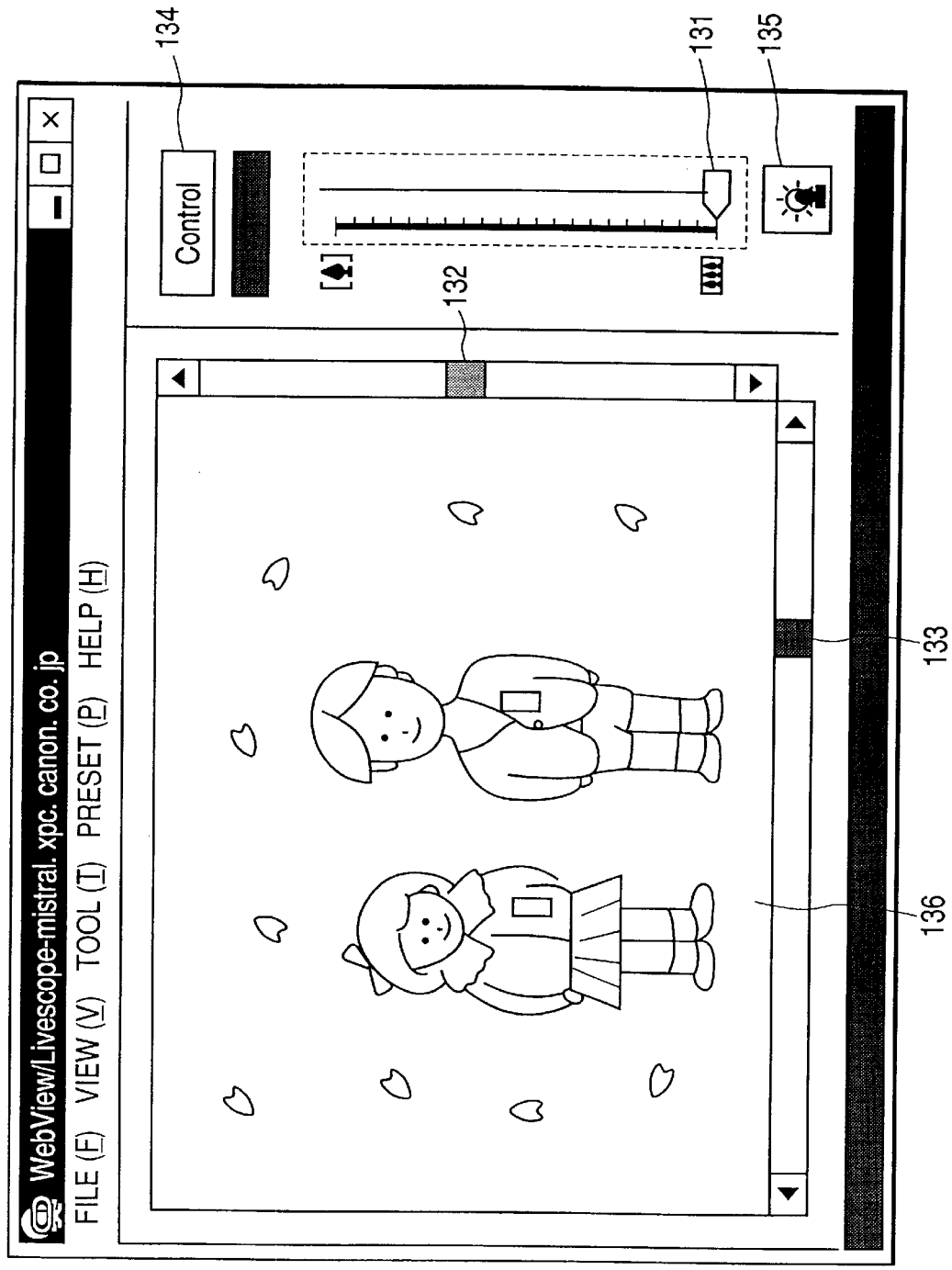
FIG. 20A is an illustration showing the display of a window before a control command is input.
Figure 20B:
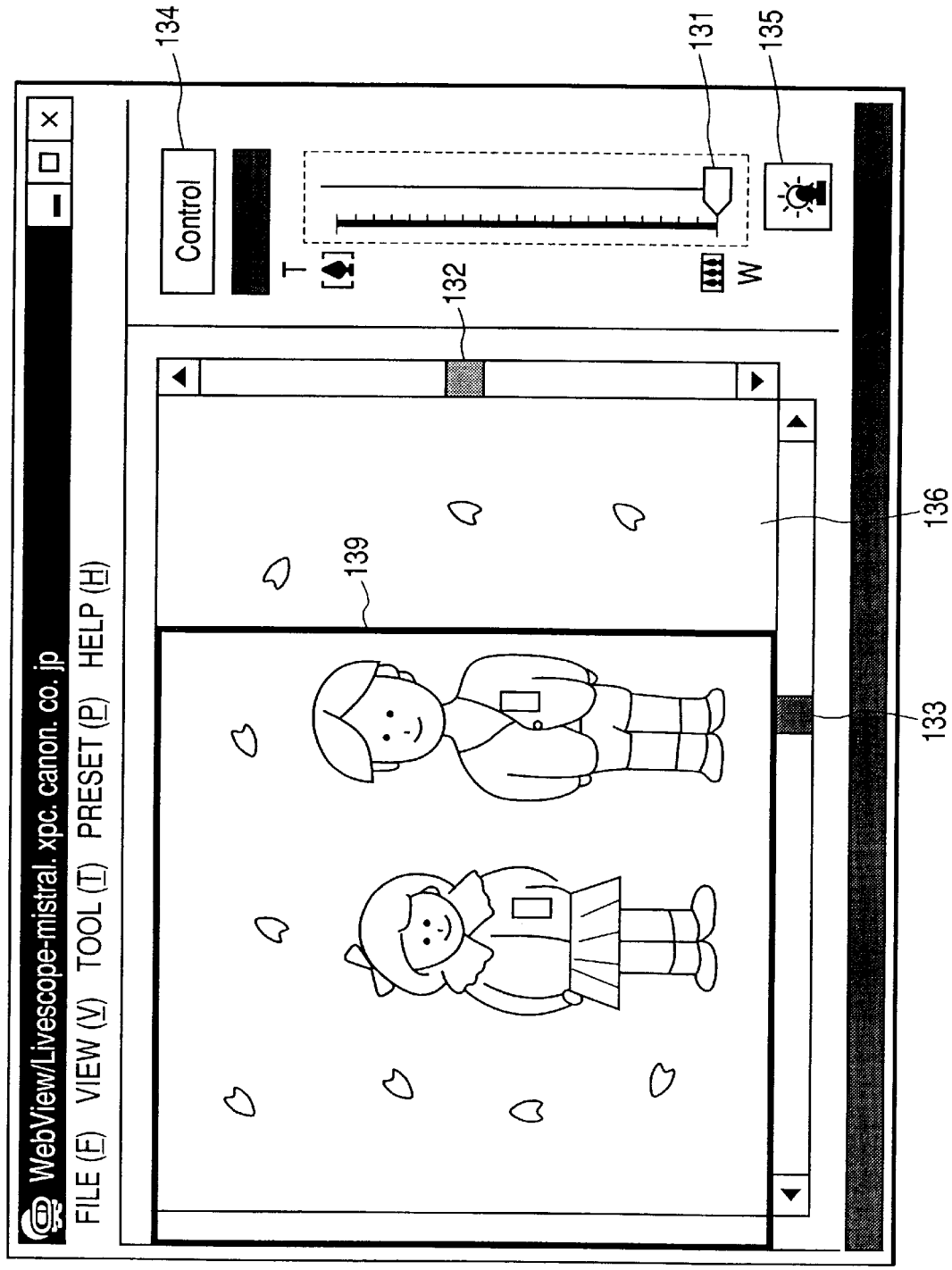
FIG. 20B is an illustration showing the display of a window after a control command is input.

In the case of this embodiment, the processing related to zoom control is described. However, it is also possible to use the processing related to the image-pickup direction of a camera. For example, when a control command for controlling the image-pickup direction of a camera to the left of the camera under the state shown in FIG. 20A in the window on the display screen of the display unit 212 shown in FIGS. 20A and 20B, the moving distance of the control command is computed as shown in FIG. 20B until an image after the image-pickup direction of the camera 103 is controlled is transmitted to display a video area displayed after controlled on an image when the control command is input by a frame. Even when the above processing is performed, it is possible to instantaneously confirm the image after the image-pickup direction of the camera 103 is controlled.

Then, the fifth embodiment of the present invention is described below.

Figure 14:
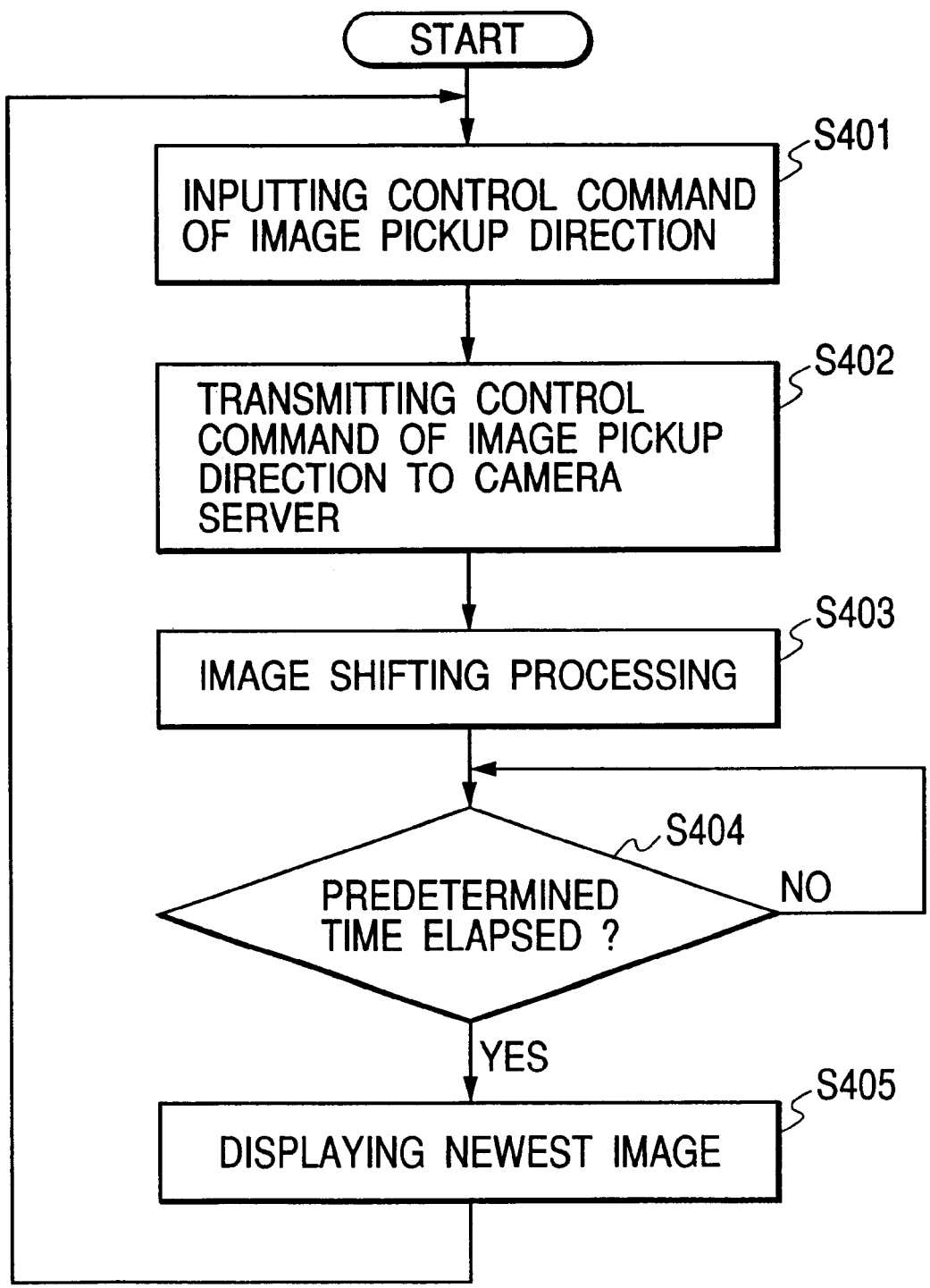
FIG. 14 is a flowchart showing the operation processing of the client of the fifth embodiment.

This embodiment is applied to the processing related to the image-pickup direction of a camera. FIG. 14 is a flowchart of the operation processing by the CPU 210 of the client 102 of this embodiment. Because the structure of the camera control system of this embodiment is the same as the case of the first embodiment, description of the structure is omitted.

First, when a control command for the image-pickup direction of the camera 103 is input through the input operation by a user in step S401, step S402 is started to transmit the input control command to the camera server 101 and then, step S403 is started.

Figure 10A:
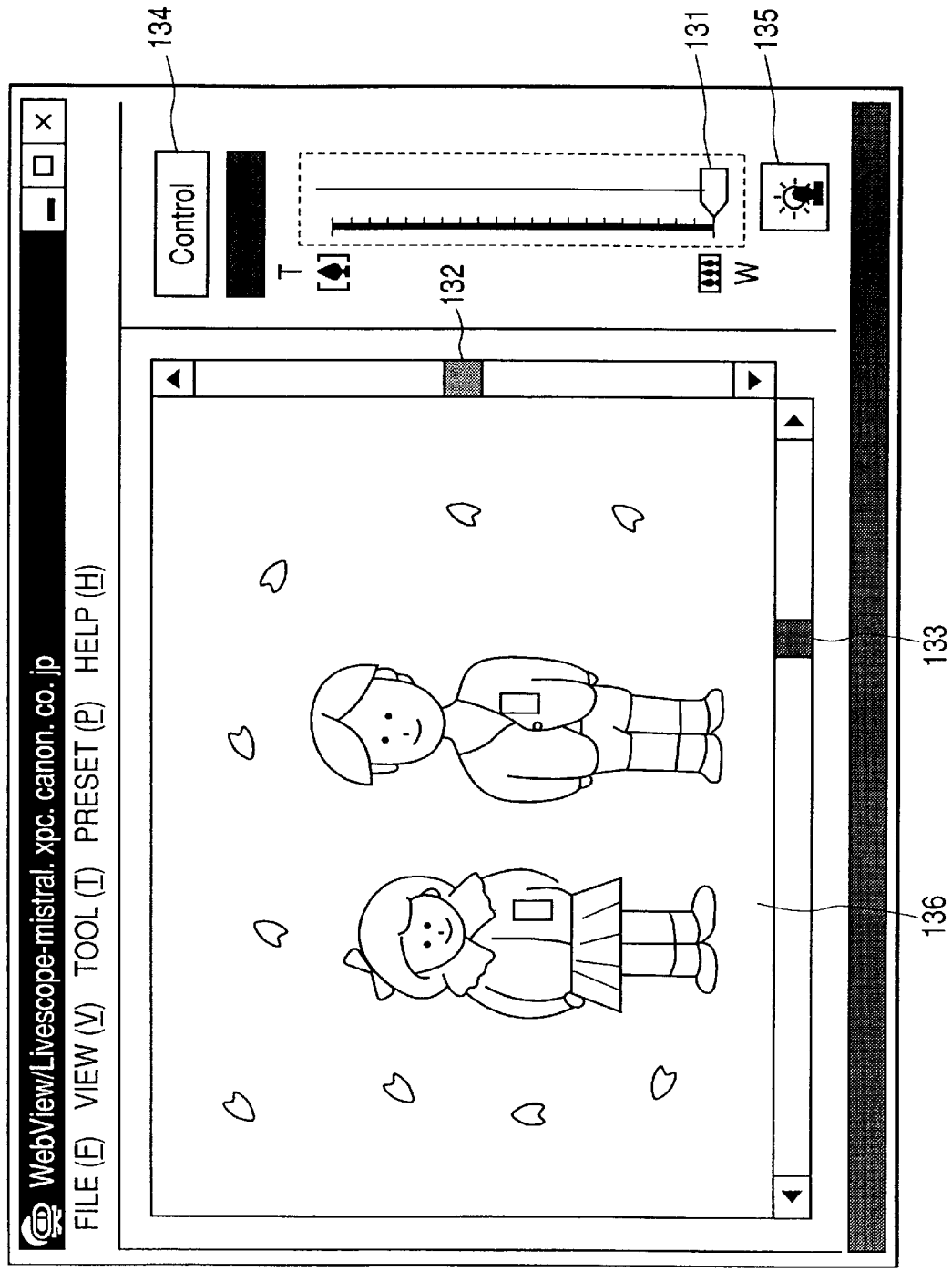
FIG. 10A is an illustration showing the display of a window before a control command is input.
Figure 10B:
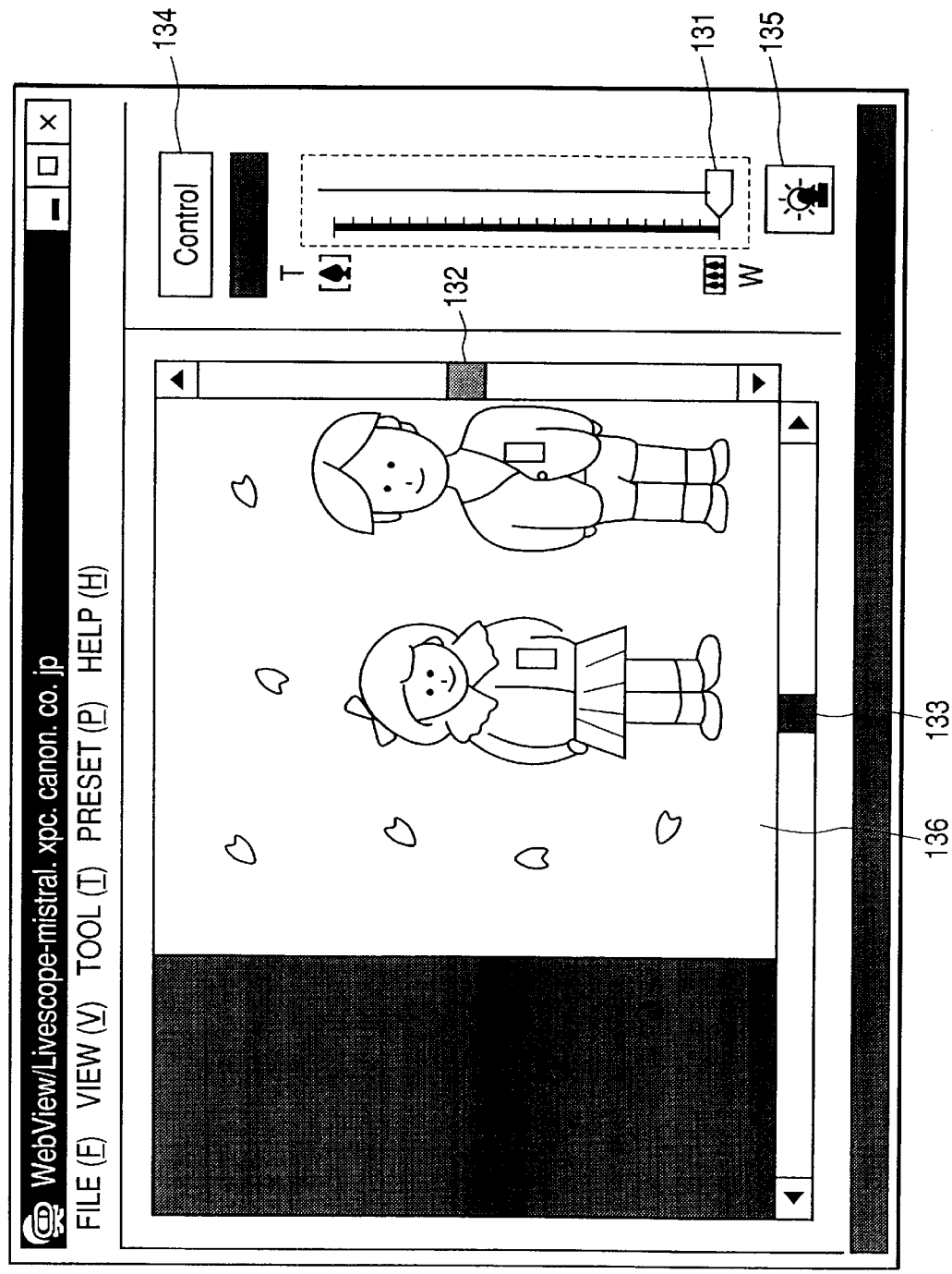
FIG. 10B is an illustration showing the display of a window after a control command is input.

In step S403, a frame image displayed in the video display area 136 when a control command is input is displayed by shifting a video area in accordance with the control command. For example, in the window on the display screen of the display unit 212 shown in FIGS. 10A and 10B, when a control command for controlling the image-pickup direction of a camera to the left of the camera is input under the state shown in FIG. 10A, the moving distance of the control command is computed as shown in FIG. 10B until an image after the image-pickup direction of the camera 103 is controlled is transmitted to display the image displayed when the control command is input, by shifting the display of that image.

Moreover, when a predetermined time elapses in step S404, step S405 is started to switch the display of the image processed in step S403 to an image (dynamic image) based on the latest video data after the image-pickup direction is controlled transmitted from the camera server 101.

As described above, even after the above processing is performed, it is possible to instantaneously confirm an image after the image-pickup direction of the camera 103 is controlled.

The operation processings in FIGS. 15, 16, 18, and 19 show processings when the operation processing in FIG. 12 is applied to a zoom control command, and the operation processing in FIG. 14 show a case of applying the operation processing shown in FIG. 12 to an image-pickup-direction control command.

The above-described embodiments can be achieved by the fact that a storage medium storing the program code of the software for realizing the functions of the embodiments is supplied to a system or apparatus and the system or the computer (or CPU or MPU) of the apparatus reads and executes the program code from the storage medium.

In this case, the program code read out of the storage medium realizes the functions of the above-described embodiments and the storage medium storing the program code achieves the present invention.

The storage medium for supplying the program code can use, for example, a floppy disk, hard disk, optical disk, photomagnetic disk, CD-ROM, CD-R, magnetic tape, non-volatile memory card, or ROM.

Moreover, by executing the program code read by the computer, not only the functions of the above embodiments are realized but also the cases are included in the present invention, in which an OS (Operating System) working on the computer performs some or all of the actual processings in accordance with the designation by the program code and the functions of the above embodiments are realized by the processings.

Furthermore, the program code read out of the storage medium is written in a memory provided for a function-extending board set into the computer or a function-extending unit connected to the computer, thereafter a CPU provided for the function-extending board or function-extending unit performs some or all of the actual processings in accordance with the designation by the program code, and the functions of the above embodiments are realized through such the processings.

When applying the present invention to the above storage medium, the program code corresponding to the previously-described flowchart is stored in the storage medium. In short, a module indispensable for a camera control system of the present invention is stored in the storage medium.

As described above, each embodiment makes it possible to prevent the delay of video display due to the transmission time of data by a network.

Many widely different embodiments of the present invention may be constructed without departing from the spirit and scope of the present invention. It should be understood that the present invention is not limited to the specific embodiments described in the specification, except as defined in the appended claims.

What is claimed is:

1. A camera control system for controlling a camera by outputting a control command to a camera server from a client via a network, comprising:
   a display device for displaying an image picked up by said camera;
   an input device for inputting a zoom control command for said camera; and
   an electronic zoom processing device for executing the electronic zoom processing of an image displayed by said display device in accordance with the zoom control command for said camera input by said input device and positional information of a zoom lens of the camera from the camera server,
   wherein said image to be subjected to the electronic zoom processing was sent from said camera to said client.

2. The cameral control system according to claim 1, further comprising:
   a control command output device for outputting the zoom control command for said camera input by said input device to said camera server via the network;
   a control device for controlling said camera in accordance with the zoom control command output by said control command output device; and
   an image output device for outputting an image picked up by said camera to said client.

3. The camera control system according to claim 2, wherein said control device is constituted so as to control the zoom of said camera by changing the position of a zoom lens in the image-pickup optical axis direction of said camera, and
   said camera control system further comprising obtainment device for obtaining the information for the present position of said zoom lens and positional-information output device for outputting said information for the present position of said zoom lens,
   wherein said electronic zoom processing device executes the electronic zoom processing for the image output by said image output device in accordance with the zoom control command for said camera and the positional information for said zoom lens output by said positional-information output device.

4. The camera control system according to claim 1, wherein
   the image process by said electronic zoom processing device is a frame image when a control command is input by said input device.

5. The camera control system according to claim 1, further comprising:
   a control command output device for outputting the zoom control command for said camera input by said input device to said camera server via the network, wherein
   said electronic zoom processing device executes the electronic zoom processing for the image displayed by said display device in accordance with the zoom control command for said camera output to said camera server by said control command output device.

6. The camera control system according to claim 1, wherein the positional data corresponds to pulse values of the zoom lens provided from the camera.

7. The camera control system according to claim 1, wherein the positional data is transmitted along with image data from the camera server to the client.

8. A client of a camera control system for controlling a camera by outputting a control command to a camera server via a network, comprising:
   a display device for displaying an image picked up by said camera;
   an input device for inputting the zoom control command for said camera; and
   an electronic zoom processing device for executing the electronic zoom processing on the image displayed by said display device and positional information of the zoom lens of the camera from the camera server, when the zoom control command for said camera is input by said input device,
   wherein the image to be subjected to the electronic zoom processing was sent from said camera to said client.

9. The client according to claim 8, wherein
   said electronic zoom processing device further executes the electronic zoom processing for an image output from a camera server together with the present operational information for said zoom lens in accordance with the zoom control command for said camera and the present operational information for said zoom lens output from said camera server.

10. A method for controlling a camera control system for controlling a camera by outputting a control command to a camera server from a client via a network, comprising:

the display step of displaying an image picked up by said camera;

the input step of inputting the zoom control command for said camera; and the electronic zoom processing step of executing the electronic zoom processing for the image displayed in said display step in accordance with the zoom control command for said camera input in said input step and positional information of a zoom lens of the camera from the camera server, wherein the image to be subjected to the electronic zoom processing was sent from said camera to said client.

11. The control method according to claim 10, further comprising:

a control command output step of outputting the zoom control command for said camera input in said input step to said camera server via the network;

a control step of controlling said camera in accordance with the zoom control command output in said control command output step; and an image output step of outputting the image picked up by said camera to said client.

12. The control method according to claim 11, wherein said control step is constituted so as to control said camera zoom by changing positions of a zoom lens in the image-pickup optical axis direction of said camera, said control method further comprising an obtainment step of obtaining the information for the present position of said zoom lens and a positional-information output step of outputting the information for the present position of said zoom lens obtained in said obtainment step to said client together with an image to be output in said image output step, wherein said electronic zoom processing step executes the electronic zoom processing for an image output in said image output step in accordance with the zoom control command for said camera and the positional-information for said zoom lens output in said positional-information output step.

13. The control method according to claim 10, wherein the image processed in said electronic zoom processing step is a frame image when a control command is input in said input step.

14. A storage medium storing a program of a client of a camera control system for controlling a camera by outputting a control command to a camera server from a client via a network, said programs comprising steps of:

displaying an image picked up by said camera; and executing the electronic zoom processing of a displayed image in accordance with the input zoom control command for said camera and positional information of a zoom lens of the camera from the camera server, wherein said displayed image was sent from said camera to said client.

15. The storage medium according to claim 14, wherein said program further comprising a step of: executing the electronic zoom processing for an image output from said camera server together with the present operational information for said zoom lens in accordance with the zoom control command for said camera and the present operational information for said camera output from said camera server.

* * * * *